United States Patent
Watanabe et al.

(10) Patent No.: US 10,229,589 B1
(45) Date of Patent: Mar. 12, 2019

(54) INVESTIGATION ASSIST DEVICE, INVESTIGATION ASSIST METHOD AND INVESTIGATION ASSIST SYSTEM

(71) Applicant: PANASONIC INTELLECTUAL PROPERTY MANAGEMENT CO., LTD., Osaka (JP)

(72) Inventors: Masao Watanabe, Fukuoka (JP); Hideyuki Yoshida, Fukuoka (JP); Takahiro Yoshimura, Fukuoka (JP); Masaomi Iiizumi, Kanagawa (JP); Takamitsu Arai, Fukuoka (JP); Takao Koishi, Fukuoka (JP); Mikio Morioka, Kanagawa (JP); So Suzuki, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/900,115

(22) Filed: Feb. 20, 2018

(30) Foreign Application Priority Data

Aug. 17, 2017 (JP) .................................. 2017-157670

(51) Int. Cl.
*G01G 1/00* (2006.01)
*G08G 1/017* (2006.01)
*H04N 7/18* (2006.01)

(52) U.S. Cl.
CPC ........... *G08G 1/0175* (2013.01); *H04N 7/181* (2013.01)

(58) Field of Classification Search
CPC ....... G08G 1/0175; H04N 7/188; H04N 7/181
See application file for complete search history.

(56) References Cited

U.S. PATENT DOCUMENTS

2006/0092043 A1* 5/2006 Lagassey ............... G07C 5/008
340/907
2014/0161314 A1* 6/2014 Ostrovsky-Berman .....................
G06F 17/30864
382/103

FOREIGN PATENT DOCUMENTS

JP 2007-174016 A 7/2007

* cited by examiner

*Primary Examiner* — Hongmin Fan
(74) *Attorney, Agent, or Firm* — Seed IP Law Group LLP

(57) ABSTRACT

An investigation assist device is connected to cameras installed at a plurality of intersections respectively so as to communicate with the cameras. The investigation assist device includes a processor and a storage that records road map information including the plurality of intersections and captured video of each of the cameras in association with camera information and intersection information. The processor retrieves a vehicle using the captured video of each of the cameras installed at one or more intersections within a predetermined distance range from the intersection where the event has occurred, based on input information including date and time information when the event has occurred, the intersection information where the event has occurred, and the feature information of the vehicle having caused the event, the captured videos corresponding to the date and time information. The processor updates the detection date and time information of the vehicle from reception date and time information on a report indicating an occurrence of the event to detection date and time information of the vehicle, updates detection point information of the vehicle from the intersection information on the intersection where the event has occurred to intersection information on another intersection where the vehicle is detected, and stores the updated information in the storage.

6 Claims, 24 Drawing Sheets

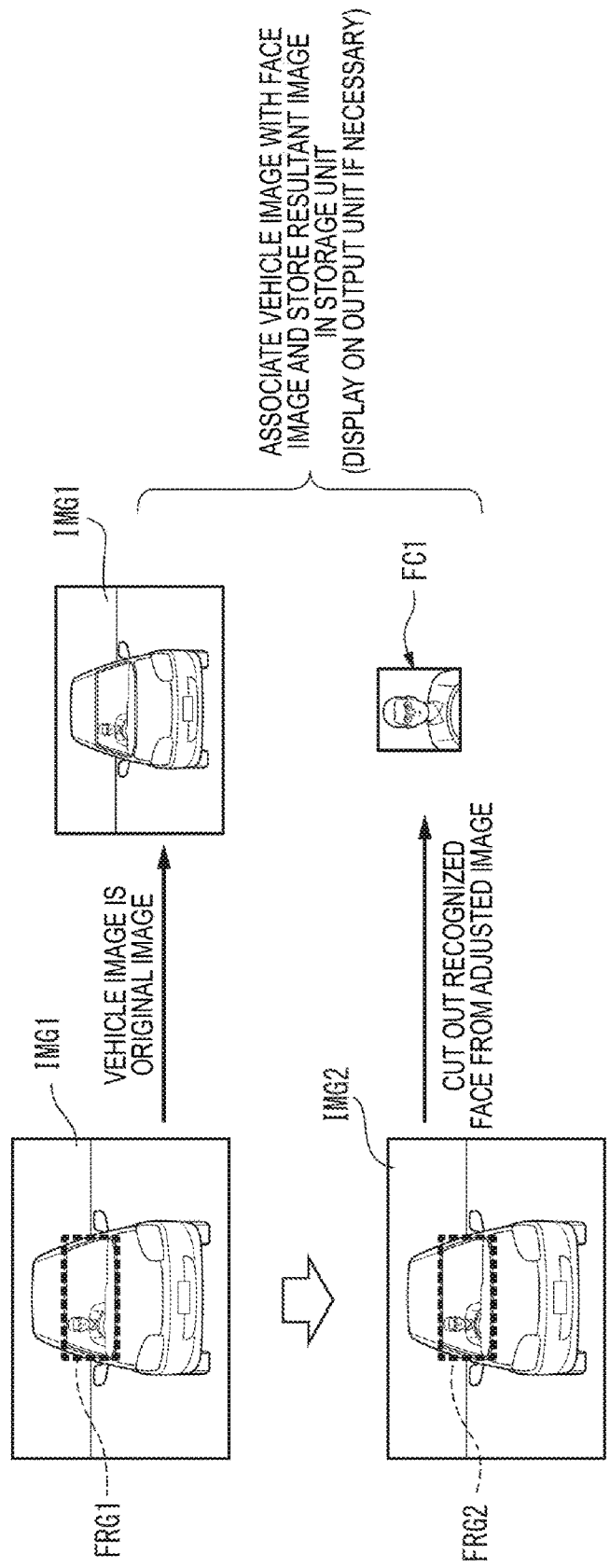

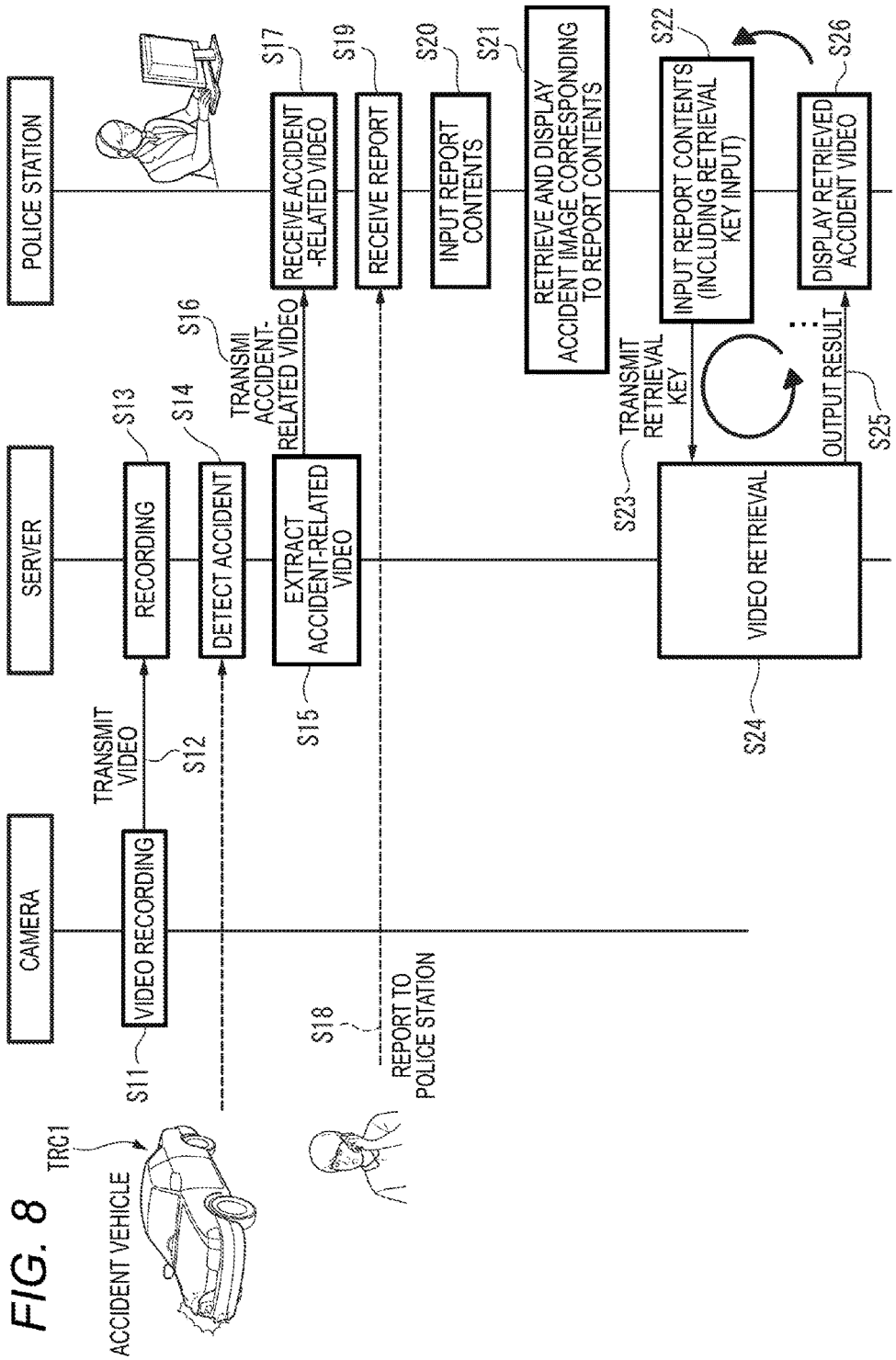

FIG. 9B

| DISPLAY DEVICE | FIRST DISPLAY METHOD | SECOND DISPLAY METHOD |
|---|---|---|
| A | C1:UNCHANGED | C1:UNCHANGED |
| B | C2:DISTORTED | C4:INVERTED AND DISTORTED |
| C | C3:UNCHANGED | C3:INVERTED |
| D | C4:DISTORTED | C2:INVERTED AND DISTORTED |

EXAMPLE OF RETRIEVAL RESULT

| IMAGE ID | FEATURE DATA | SCORE |
|---|---|---|
| P1 | LMG-006 | 80 |
| P2 | JJJ-543 | 85 |
| P3 | PAN-329 | 83 |
| : | : | : |

← SCR1

EXAMPLE OF RETRIEVAL RESULT AFTER ADJUSTMENT

| IMAGE ID | FEATURE DATA | SCORE |
|---|---|---|
| P1 | LMG-006 | 80 |
| P2 | JJJ-543 | 75 |
| P3 | PAN-329 | 83 |
| : | : | : |

← SCR2

INVESTIGATION ASSIST DEVICE, INVESTIGATION ASSIST METHOD AND INVESTIGATION ASSIST SYSTEM

BACKGROUND OF THE INVENTION

1. Field of the Invention

The present disclosure relates to an investigation assist device, an investigation assist method and an investigation system.

2. Description of the Related Art

In the related art, a technique is known in which a plurality of cameras are disposed at predetermined locations on a traveling route of a vehicle, and camera image information captured by the respective cameras is displayed on a display device in a terminal device mounted in the vehicle through a network and wireless information exchange device (for example, refer to JP-A-2007-174016). According to JP-A-2007-174016, a user can obtain a real-time camera image with a large information amount, based on the camera image information captured by the plurality of cameras disposed on the traveling route of the vehicle.

In JP-A-2007-174016, the camera image information captured by the plurality of cameras is displayed on the display device in the terminal device mounted on the vehicle. Therefore, a user (for example, driver) can check real-time captured images at the locations where the respective cameras are disposed. However, in JP-A-2007-174016, it is not considered the method of narrowing down an escape route of a vehicle having caused an event such as an incident or accident, when the event occurred around the traveling route of the vehicle (for example, an intersection where many people and vehicles come and go). For this reason, although the technique described in JP-A-2007-174016 is used when the above-described event such as an incident or accident occurred, the system cannot track the escape route of the getaway vehicle, and has difficulties in finding the suspect or criminal of the incident or accident in early stage.

The present disclosure has been made in view of the above problems, and an object thereof is to provide an investigation assist device, an investigation assist method, and an investigation assist system which can effectively narrow down escape routes of a getaway vehicle and assist finding the suspect or criminal of an incident or accident in early stage, when the incident or accident occurred around an intersection where many people and vehicles come and go.

SUMMARY OF THE INVENTION

The present disclosure provides an investigation assist device that is connected to cameras installed at a plurality of intersections respectively so as to communicate with the cameras. The investigation assist device includes a processor; and a storage that records road map information including the plurality of intersections and captured video of each of the cameras in association with camera information and intersection information. The processor retrieves a vehicle using the captured video of each of the cameras installed at one or more intersections within a predetermined distance range from the intersection where an event has occurred, based on input information including date and time information when the event has occurred, the intersection information where the event has occurred, and the feature information of the vehicle having caused the event, the captured videos corresponding to the date and time information. The processor updates detection date and time information of the vehicle from reception date and time information on a report indicating an occurrence of the event to detection date and time information of the vehicle, and updates detection point information of the vehicle from the intersection information on the intersection where the event has occurred to intersection information on another intersection where the vehicle is detected, and stores the updated information in the storage.

Furthermore, the present disclosure provides an investigation assist method using an investigation assist device that is connected to cameras installed at a plurality of intersections respectively so as to communicate with the cameras. The investigation assist method has the step of retrieving a vehicle using captured video of each of the cameras installed at one or more intersections within a predetermined distance range from the intersection where an event has occurred, based on input information including the date and time information when the event has occurred, the intersection information where the event has occurred, and feature information of the vehicle having caused the event. The captured videos corresponds to the date and time information. The investigating assist method has the step of updating the detection date and time information of the vehicle from the reception date and time information on a report indicating an occurrence of the event to the detection date and time information of the vehicle, updates detection point information of the vehicle from the intersection information on the intersection where the event has occurred to intersection information on another intersection where the vehicle is detected, and stores the updated information in a storage Furthermore, the present disclosure provides an investigation assist system including cameras installed at a plurality of intersections respectively and an investigation assist device connected to the cameras so as to communicate with the cameras. The investigation assist device includes a processor and a storage that records road map information including the plurality of intersections and captured video of each of the cameras in association with camera information and intersection information. The processor retrieves a vehicle using the captured video of each of the cameras installed at one or more intersections within a predetermined distance range from the intersection where the event has occurred, based on input information including the date and time information when the event has occurred, the intersection information where the event has occurred, and feature information of the vehicle having caused the event, the captured videos corresponding to the date and time information. The processor updates detection date and time information of the vehicle from reception date and time information on a report indicating an occurrence of the event to detection date and time information of the vehicle, updates detection point information of the vehicle from the information on the intersection where the event has occurred to intersection information on another intersection where the vehicle is detected, and stores the updated information in the storage.

According to the present disclosure, it is possible to efficiently reduce labor and time required for narrowing down a vehicle having run away from the intersection, and efficiently assist finding the suspect or criminal of the accident or incident in early stage when an incident or accident occurred at an intersection where many people or vehicles come and go.

BRIEF DESCRIPTION OF THE DRAWINGS

FIG. 7A is a diagram for describing an example of image processing of a recording server or a cloud server according to a first embodiment;

FIG. 8 is a sequence diagram illustrating a procedure example of an operation of inputting report contents through a retrieval terminal and an operation of retrieving an image through a recording server according to a second embodiment;

FIG. 9B is a table for describing first and second display methods according to a third embodiment;

DETAILED DESCRIPTION OF THE PREFERRED EMBODIMENTS

Background to First Embodiment

In JP-A-2007-174016, the camera image information captured by the plurality of cameras is displayed on the display device in the terminal device mounted on the vehicle. Therefore, the user (for example, driver) can check real-time captured images at the locations where the respective cameras are disposed. However, in JP-A-2007-174016, it is not considered to extract a face image of a person in a vehicle having caused an event such as an incident or accident (for example, the suspect or criminal of the incident or accident), when the event occurred around the traveling route of the vehicle (for example, an intersection where many people and vehicles come and go). In particular, when a getaway vehicle appears on a video captured by a camera installed at an intersection, a person in the getaway vehicle may appear dark. For this reason, although the technique described in JP-A-2007-174016 is used when the above-described event such as an incident or accident occurred, the system cannot rapidly identify the face of the person in the getaway vehicle, and has difficulties in finding the suspect or criminal of the incident or accident in early stage.

Therefore, in a first embodiment, an investigation assist device, an investigation assist method, and an investigation assist system are exemplified which can extract a face image of a person in a getaway vehicle with high precision and assist finding the suspect or criminal of an incident or accident in early stage, when the incident or accident occurred at an intersection where many people and vehicle come and go.

Hereafter, embodiments will be described in detail in which an investigation assist device, an investigation assist method, an investigation assist system, an operator terminal, and a video display method are specifically disclosed, with reference to the accompanying drawings. However, more detailed descriptions than needed may be omitted. For example, the detailed descriptions of known elements or the duplicated descriptions of substantially the same components may be omitted. This is in order to not only avoid unnecessary redundancy of the following descriptions, but also promote understanding of those skilled in the art. The accompanying drawings and the following descriptions are provided to make a person skilled in the art to understand the present disclosure, and the subjects of descriptions in claims are not limited by the drawings and descriptions.

In the following embodiments, a use case will be exemplified in which when an event such as an incident or accident occurred on or around a traveling route of a vehicle (for example, an intersection where many people or vehicles come and go), the system assists an investigation of a policeman by tracking the whereabouts of the vehicle of a suspect or criminal in real time after the event occurred.

First Embodiment

Figure 1:
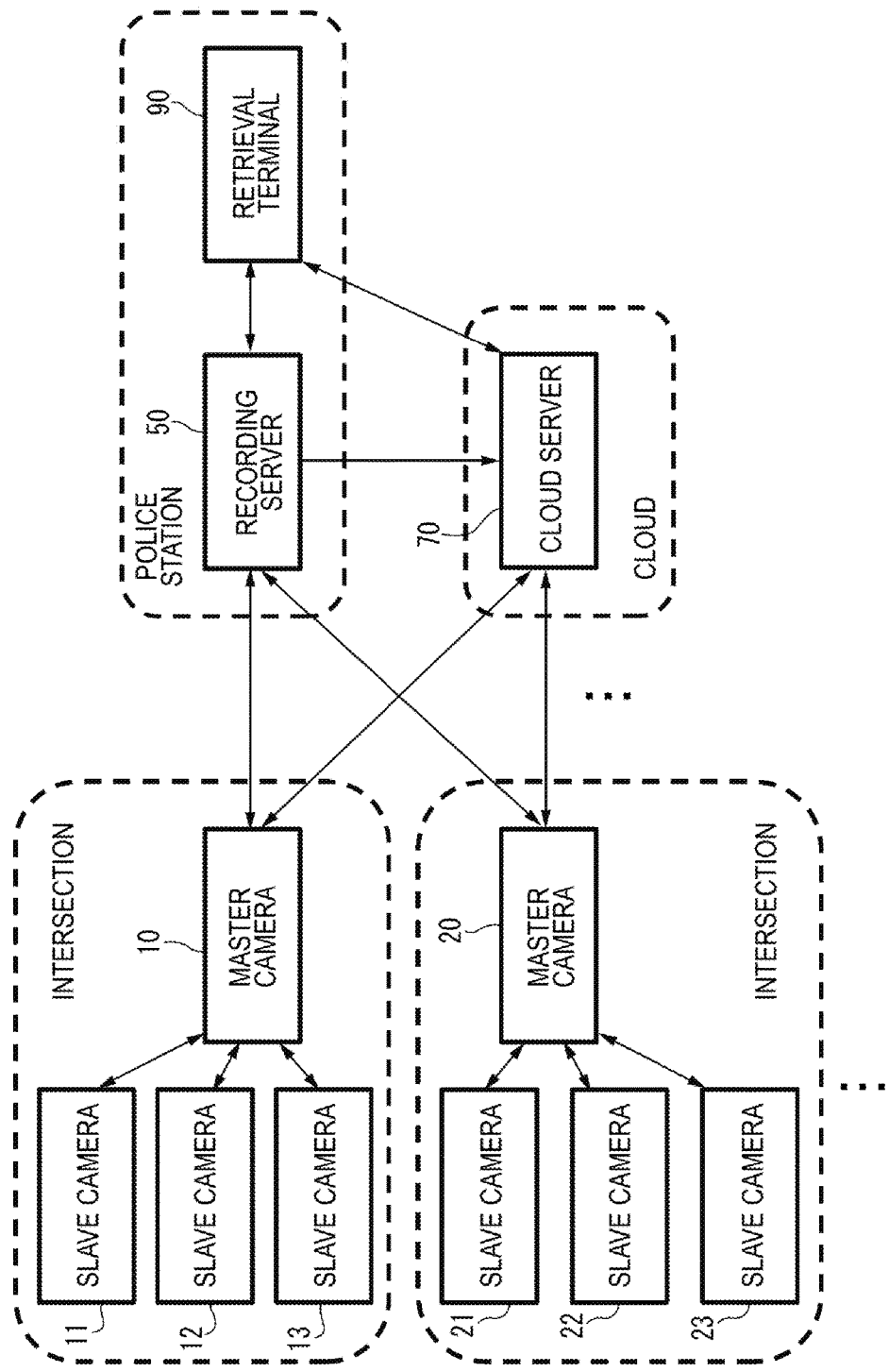
FIG. 1 is a block diagram illustrating a configuration example of an investigation assist system according to embodiments.
Figure 2:
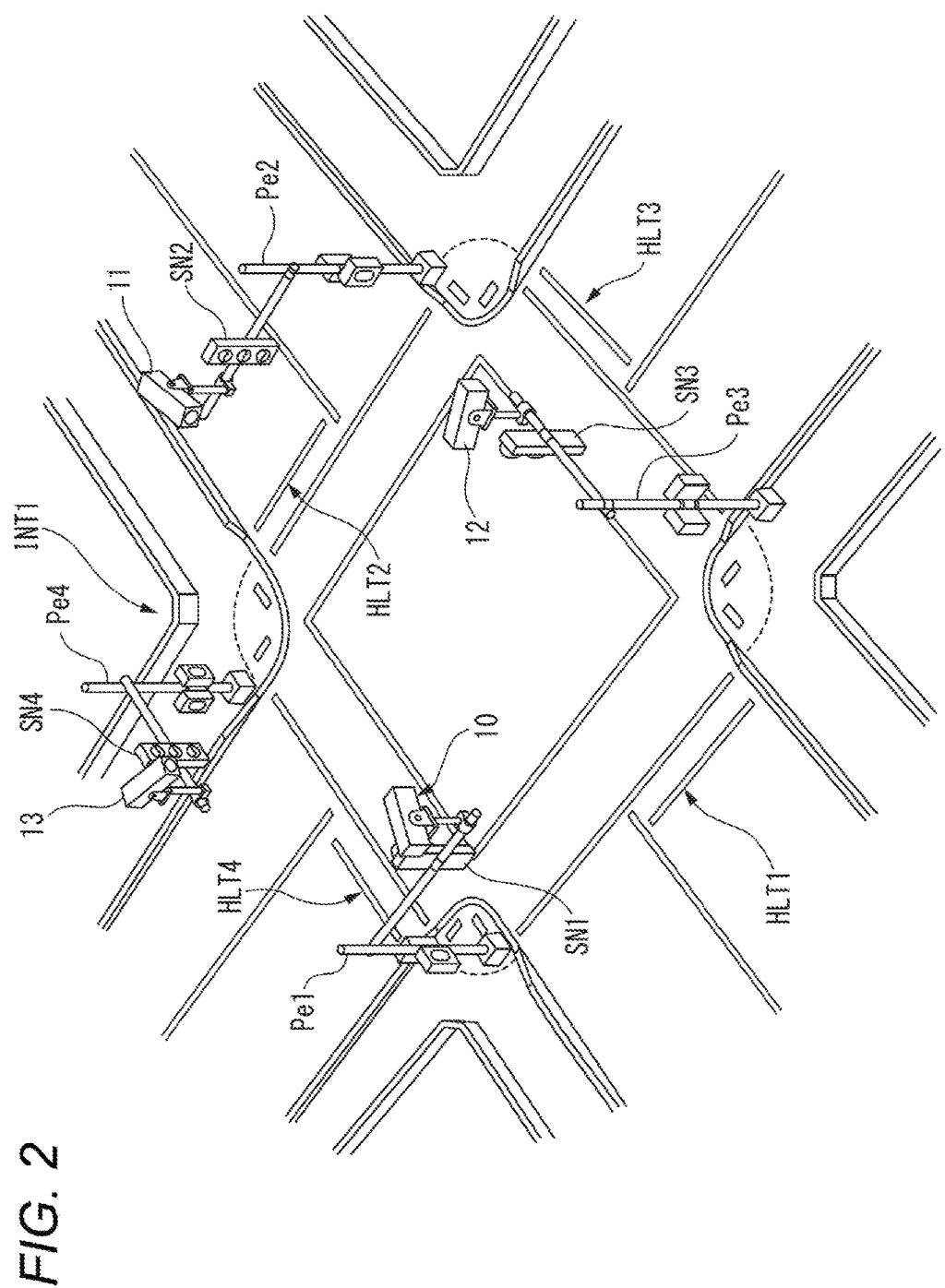
FIG. 2 is a view illustrating an example of an installation layout of a plurality of cameras at intersections.

FIG. 1 is a block diagram illustrating a configuration example of an investigation assist system 100 according to embodiments. FIG. 2 is a view illustrating an example of an installation layout of a plurality of cameras at an intersection INT1. The investigation assist system 100 includes a plurality of cameras installed at each intersection, a recording server 50 and a retrieval terminal 90 installed in a police station, and a cloud server 70 present on the cloud.

In the investigation assist system 100, a plurality of cameras (for example, cameras 10 to 13) constitute one segment and are installed at each intersection. In the plurality of cameras in one segment, any one camera (for example, the camera 10) serves as a master camera, and the other cameras (for example, the cameras 11 to 13) serve as slave cameras. The master camera can communicate with the plurality of slave cameras connected to the master camera, and communicate with the recording server 50 or the cloud server 70. The slave cameras can communicate with the master camera connected to the slave cameras. FIG. 1 illustrates that the plurality of cameras are installed at the intersection (one segment), but only one master camera may be installed. Furthermore, only a plurality of master cameras may be installed at the intersection without slave cameras.

The cameras 11 to 13 and 21 to 23 serving as slave cameras are monitoring cameras which can capture subjects at view angles which were respectively set when the cameras were installed (for example, videos showing the situations at the intersections), and transmit the captured videos to the cameras 10 and 20 serving the master cameras. Each of the captured videos may include not only data of the captured video, but also identification information of the camera having captured the video (an example of camera information), and the same applies hereafter.

The cameras 10 and 20 serving as the master cameras receive the captured videos transmitted by the cameras 11 to 13 and 21 to 23 serving as the slave cameras connected to the cameras, respectively. The cameras 10 and 20 are monitoring cameras which can capture subjects at view angles set when the master cameras were installed (for example, videos showing the situations at the intersections). The cameras 10 and 20 correlate the captured videos thereof with the captured videos transmitted from the slave cameras, and transmit the videos to the recording server 50 or the cloud server 70.

The cameras 10 to 13 are installed to capture the intersection INT1 as illustrated in FIG. 2. The cameras 10 and 11 are installed to substantially face each other. Similarly, the cameras 12 and 13 are installed to substantially face each other.

The camera 10 is installed on a assist bar mounted perpendicular to a pole Pe1 erected in the vertical direction, and disposed adjacent to a traffic signal SN1. The center of the view angle of the camera 10 is set to the central portion of the intersection INT1, and a stop line HLT2 around the central portion of the intersection INT1 and a predetermined area around the stop line HLT2 are included in the view angle. Therefore, the camera 10 can capture videos of subjects within the set view angle.

The camera 11 is installed on a assist bar mounted perpendicular to a pole Pe2 erected in the vertical direction, and disposed adjacent to a traffic signal SN2. The center of the view angle of the camera 11 is set to the central portion of the intersection INT1, and a stop line HLT1 around the central portion of the intersection INT1 and a predetermined area around the stop line HLT1 are included in the view angle of the camera 11. Therefore, the camera 11 can capture videos of subjects within the set view angle.

The camera 12 is installed on a assist bar mounted perpendicular to a pole Pe3 erected in the vertical direction, and disposed adjacent to a traffic signal SN3. The center of the view angle of the camera 12 is set to the central portion of the intersection INT1, and a stop line HLT4 around the central portion of intersection INT1 and a predetermined area around the stop line HLT4 are included in the view angle of the camera 12. Therefore, the camera 12 can capture videos of subjects within the set view angle.

The camera 13 is installed on a assist bar mounted perpendicular to a pole Pe4 erected in the vertical direction, and disposed adjacent to a traffic signal SN4. The center of the view angle of the camera 13 is set to the central portion of the intersection INT1, and a stop line HLT3 around the central portion of the intersection INT1 and a predetermined area around the stop line HLT3 are included in the view angle of the camera 13. Therefore, the camera 13 can capture videos of subjects within the set view angle.

Figure 9A:
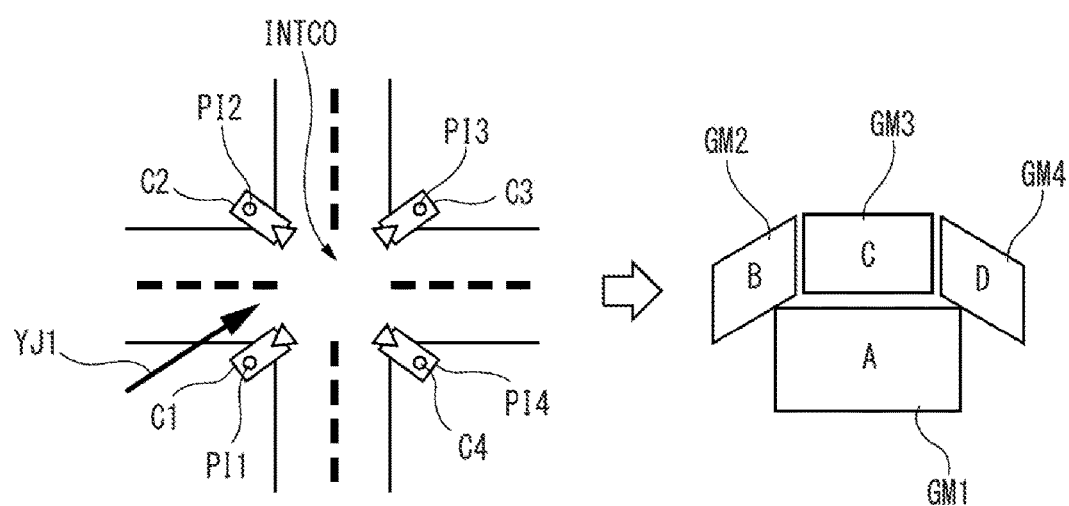
FIG. 9A a diagram for describing an arrangement example of a plurality of cameras at an intersection and an arrangement example of videos captured by the respective cameras and displayed on one screen.

The cameras 20 to 23 illustrated in FIG. 1 may also be installed at an intersection in the same manner as the cameras 10 to 13. The cameras 10 to 13 and 20 to 23 are not limited to the installation layout illustrated in FIG. 2. For example, as illustrated in FIG. 9A, each of the cameras may be installed in such a manner that the optical axis of the lens thereof faces the optical axis of the lens of the corresponding camera installed in the diagonal direction. Although described later in detail, the installation layout illustrated in FIG. 9A shows that the cameras are installed at end areas of sidewalks which lead to an intersection INTC0, and mounted on poles PI1 to PI4 erected in the vertical direction with respect to the ground surface.

Figure 4:
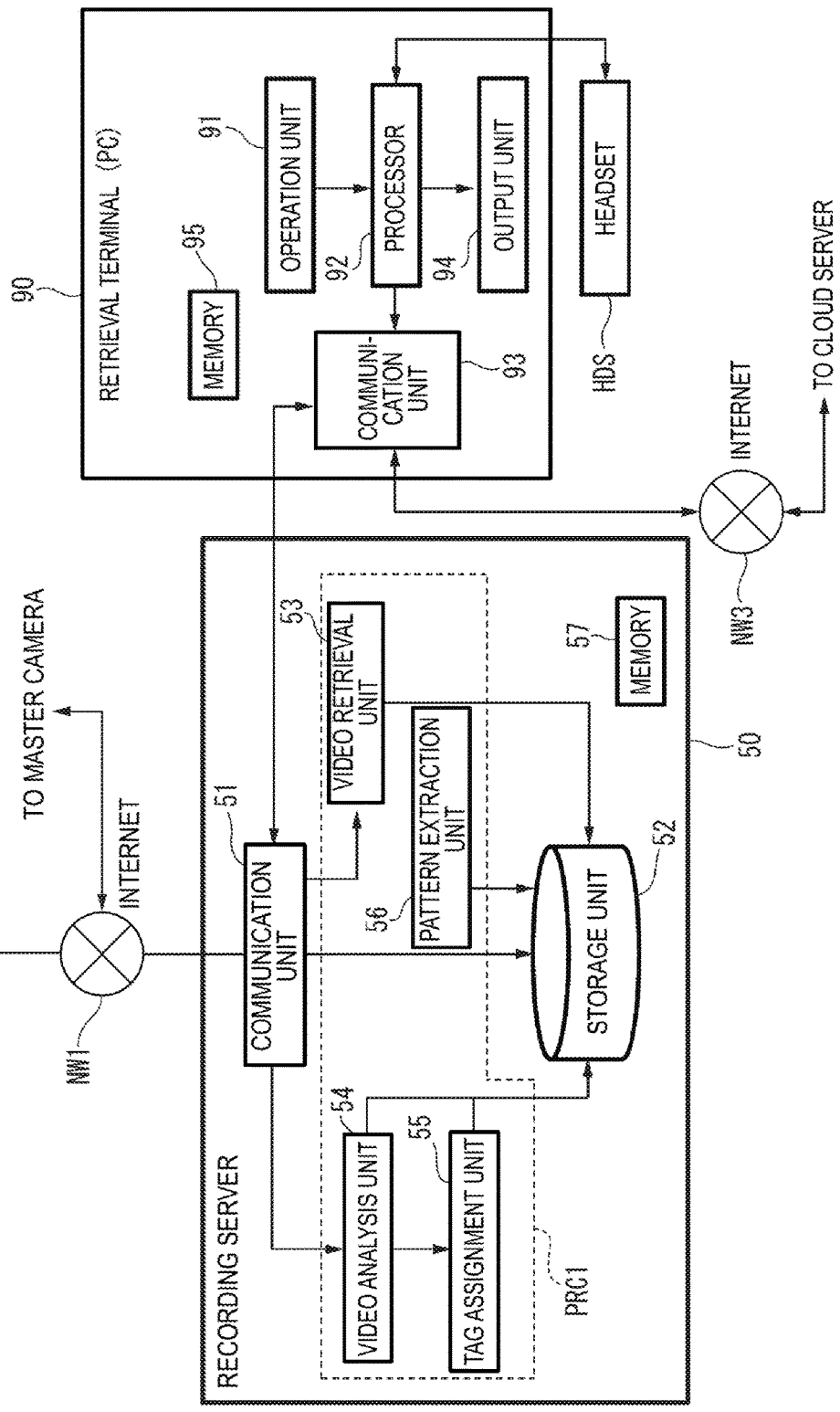
FIG. 4 is a block diagram illustrating an example of internal configurations of a recording server and a retrieval terminal according to embodiments.

The recording server 50 (an example of the investigation assist device) is installed in a police station, receives captured videos transmitted from cameras installed at intersections under the jurisdiction of the police station (for example, master cameras), and stores the received videos in a storage unit 52 (refer to FIG. 4). The stored videos are analyzed by the recording server 50 based on a request (instruction) from a retrieval terminal 90, when an event such as an incident or accident occurred, and used for acquiring detailed information on the incident or accident. The recording server 50 may transmit (upload) a part of the captured videos to the cloud server 70 in order to back up the captured videos. The part of the captured videos may include captured videos designated by an operation of a terminal (not illustrated) used by a manager, for example, captured videos for an important or serious event. The recording server 50 analyzes the received videos, acquires tag information, correlates the acquired tag information with the analyzed videos, and stores the resultant videos in the storage unit 52. The tag information may indicate information on the face of a person and the type or color of a vehicle in the captured videos. The recording server 50 may detect an occurrence of an event such as an incident or accident at or around the intersection through the analysis of the captured videos.

The retrieval terminal 90 (an example of the operator terminal) is installed in the police station, and used by an official in the police station (that is, an operator or policeman using the retrieval terminal 90). For example, the retrieval terminal 90 may include a laptop or notebook PC (Personal Computer). When an incident or accident occurred, the operator receives a call (incoming call) from a person (reporter) who reported the occurrence of the incident or accident to the police station, makes an inquiry about detailed information on the incident or accident from the reporter, and correctly records various pieces of information acquired through the inquiry as data. The retrieval terminal 90 is not limited to the above-described PC, but may include a computer with a communication function, such as a smart phone, tablet terminal and PDA (Personal Digital Assistant). The retrieval terminal 90 requests (instructs) the recording server 50 or the cloud server 70 to retrieve or analyze the captured videos stored in the recording server 50 or the cloud server 70, and displays the retrieval result or analysis result on an output unit 94 (refer to FIG. 4).

The cloud server 70 is provided on a network such as a cloud, receives captured videos transmitted from the recording server 50 or cameras installed at intersections under the jurisdiction of police stations (specifically, master cameras), and stores the received videos in the storage unit 72 (refer to FIG. 4). The stored captured videos are analyzed by the cloud server 70 based on a request (instruction) from the retrieval terminal 90 when an event such as an incident or accident occurred, and used for acquiring detailed information on the incident or accident. The cloud server 70 analyzes the received videos, acquires tag information, correlates the acquired tag information with the analyzed videos, and stores the resultant videos in the storage unit 72. The tag information may indicate information on the faces of people and the types or colors of vehicles in the captured videos. The cloud server 70 may detect an occurrence of an event such as an incident or accident at or around an intersection through the analysis of the captured videos.

FIG. 1 illustrates that only one recording server 50 and one retrieval terminal 90 are provided in the police station, but a plurality of recording servers 50 and retrieval terminals 90 may be provided. Moreover, a plurality of police stations may be included in the investigation assist system 100. Similarly, FIG. 1 illustrates that only one cloud server 70 is provided on the cloud, but a plurality of cloud servers may be provided.

Figure 3:
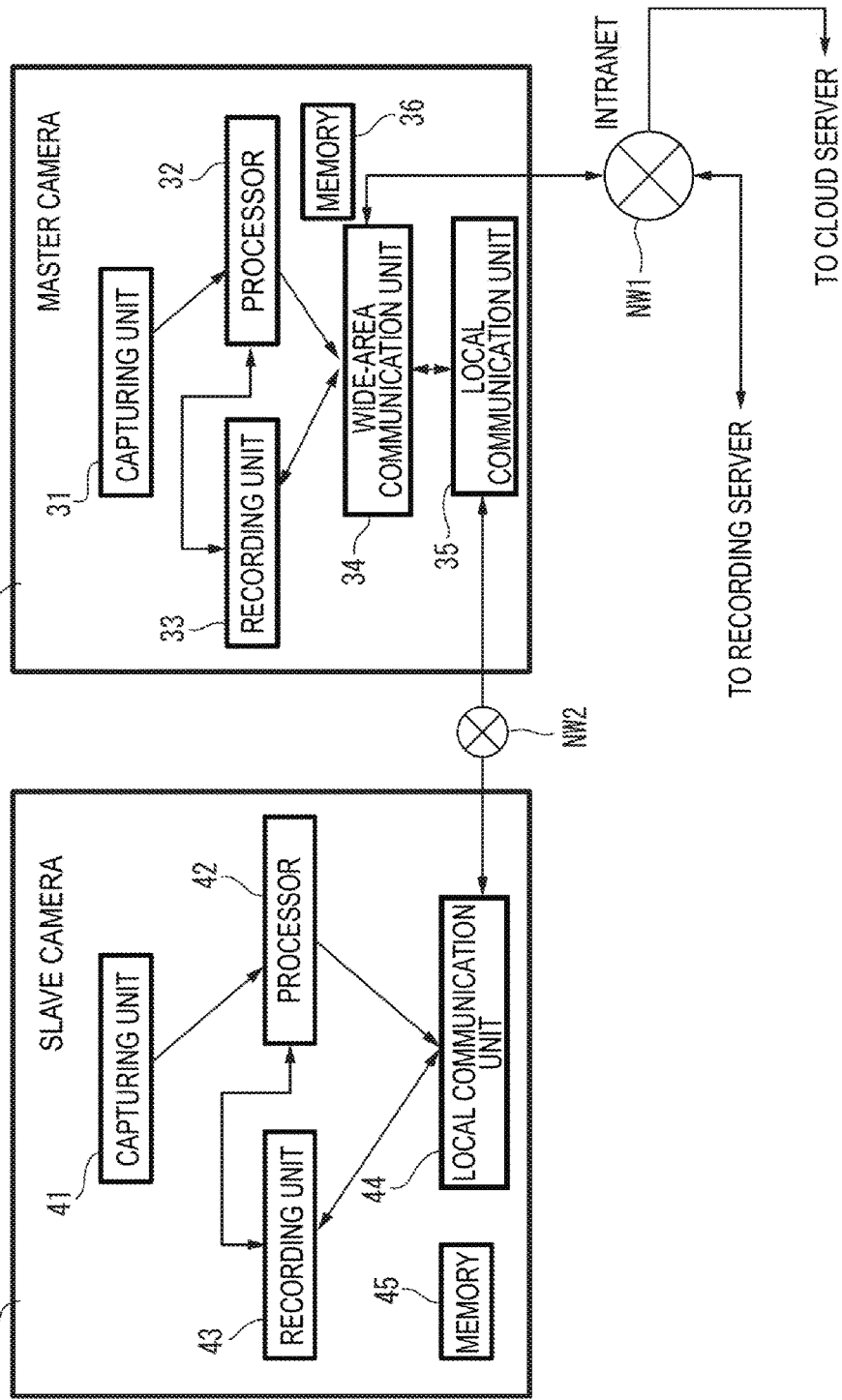
FIG. 3 is a block diagram illustrating an example of internal configurations of a master camera and a slave camera according to embodiments.

FIG. 3 is a block diagram illustrating internal configurations of the master camera and the slave camera according to embodiments. The cameras 11 to 13 corresponding to the slave cameras and the camera 10 corresponding to the master camera may be connected through a wired LAN (Local Area Network) such as an Intranet NW2, and connected through a local wireless network (for example, a wireless LAN or WiGig (registered trademark)).

Each of the cameras 11 to 13 and 21 to 23 corresponding to the slave cameras includes a capturing unit 41, a processor 42, a recording unit 43 and a local communication unit 44. In order to simplify the descriptions of the slave cameras, the camera 11 will be representatively exemplified. In FIG. 3, however, the camera 11 may be replaced with any one of the cameras 12, 13, 21, 22 and 23.

The capturing unit 41 includes an imaging lens and a solid state imaging device such as a CCD (Charge Coupled Device) image sensor or CMOS (Complementary Metal Oxide Semiconductor) image sensor. The capturing unit 41 outputs data of a captured video for subjects to the processor 42 at all times while the camera 11 is powered on, the captured video being acquired through a capturing operation of the solid state imaging device. The capturing unit 41 may include a pan tilt zoom mechanism for changing the capturing direction or zoom magnification of the camera.

The processor 42 is configured using a CPU (Central Processing Unit), MPU (Micro Processing Unit), DSP (Digital Signal Processor) or FPGA (Field-Programmable Gate Array).

The processor 42 functions as a control unit of the camera 11, and performs a control process for controlling overall operations of the respective units of the camera 11, a data input/output process among the respective units of the camera 11, a data calculation process and a data storage process. The processor 42 operates according to a program and data stored in the memory 45. The processor 42 uses the memory 45 during operation, acquires the current time information, and records (stores) the data of the video captured by the capturing unit 41 in the recording unit 43. Although not illustrated in FIG. 3, the camera 11 may include a GPS (Global Positioning System) receiver. In this case, the camera 11 may acquire the current position information from the GPS receiver, correlate the data of the captured video with the position information, and record the resultant data.

The GPS receiver will be briefly described. The GPS receiver receives satellite signals from a plurality of GPS signal transmitters (for examples, four navigation satellites), the satellite signals including the signal transmission times and position coordinates of the GPS signal transmitters. The GPS receiver calculates the current position coordinate of the master camera or slave camera based on the plurality of satellite signals and the reception times of the satellite signals. The calculation may be not performed by the GPS receiver, but performed by the processor 32 or 42 to which an output of the GPS receiver is input. The reception time information may be used for correcting the system time of the master camera or slave camera. The system time is used for recording the capturing times of images constituting a captured video, for example.

The processor 42 may control the capturing condition of the capturing unit 41 according to a control command from outside, received by the local communication unit 44. For example, when the control command from outside commands the processor to change a capturing direction, the processor 42 changes the capturing direction during a capturing operation of the capturing unit 41, according to the control command. For example, when the control command from outside commands the processor 42 to change the zoom magnification, the processor 42 changes the zoom magnification during a capturing operation of the capturing unit 41, according to the control command. For example, when the control command from outside commands the processor 42 to perform a tracking process for the designated subject, the processor 42 tracks the designated subject using the captured video data recorded in the recording unit 43, according to the control command. When various kinds of control commands are acquired by the processor 42, the processor 42 may perform processes corresponding to the respective control commands.

The processor 42 repeatedly transmits the captured video data recorded in the recording unit 43 to the master camera (for example, the camera 10) through the local communication unit 44. The repeated transmission is not limited to transmitting data whenever a predetermined period of time elapses, but may include transmitting data whenever an irregular time interval elapses, and transmitting data over a plurality of times. Hereafter, the same applies.

The recording unit 43 may include a semiconductor memory embedded in the camera 11 (for example, flash memory) or an external memory medium such as a memory card (for example, SD card), which is not embedded in the camera 11. The recording unit 43 correlates the data of the captured video generated by the processor 42 with the identification information of the camera 11 (an example of camera information) or the date and time information during capturing, and records the resultant data. The recording unit 43 normally pre-buffers and stores data of a video captured for a predetermined time, and continuously stores data of a video captured for a predetermined time (for example, 30 seconds) before the current time. When the recording unit 43 is configured as a memory card, the recording unit 43 may be freely inserted into and removed from the casing of the camera 11.

The local communication unit 44 is configured using a communication circuit. The local communication unit 44 transmits the data of the captured video recorded in the recording unit 43 to the master camera (for example, the camera 10), based on an instruction of the processor 42, through short range wireless communication.

The memory 45 is configured using a RAM (Random Access Memory) and ROM (Read Only Memory), for example, and temporarily stores a program or data required for performing an operation of the camera 11 and information or data generated during the operation of the camera 11. The RAM is a work memory used during an operation of the processor 42, for example. The ROM stores a program and data for controlling the processor 42 in advance. The memory 45 stores identification information for identifying the camera 11 (for example, serial number) and various pieces of setting information.

The camera 10 corresponding to the master camera includes a capturing unit 31, a processor 32, a recording unit 33, a wide-area communication unit 34, a local communication unit 35 and a memory 36. In order to simplify the descriptions of the master cameras, the camera 10 will be representatively exemplified. In FIG. 3, however, the camera 10 may be replaced with the camera 20.

The capturing unit 31 includes an imaging lens and a solid state imaging device such as a CCD image sensor or CMOS image sensor. The capturing unit 31 outputs data of a captured video of subjects to the processor 32 at all times while the camera 10 is powered on, the captured video being acquired through a capturing operation by the solid state imaging device. The capturing unit 31 may include a pan tilt zoom mechanism for changing the capturing direction or zoom magnification of the camera.

The processor 32 is configured using a CPU, MPU, DSP or FPGA, for example. The processor 32 functions as a control unit of the camera 10, and performs a control process for controlling overall operations of the respective units of the camera 10, a data input/output process among the respective units of the camera 10, a data calculation process and a data storage process. The processor 32 operates according to a program and data stored in the memory 36. The processor 32 uses the memory 36 during operation, acquires the current time information, or records data of a video captured by the capturing unit 31 or data of captured videos transmitted from the slave cameras (for example, cameras 11 to 13) into the recording unit 33. Although not illustrated in FIG. 3, the camera 10 may have a GPS receiver. In this case, the camera 10 may acquire the current position information from the GPS receiver.

The processor 32 may control the capturing condition of the capturing unit 31 according to a control command from outside, received by the local communication unit 35. For example, when the control command from outside commands the processor 32 to change a capturing direction, the processor 32 changes the capturing direction during a capturing operation of the capturing unit 31, according to the control command. For example, when the control command from outside commands the processor 32 to change the zoom magnification, the processor 32 changes the zoom magnification during a capturing operation of the capturing unit 31, according to the control command. For example, when the control command from outside commands the processor to perform a tracking process for a designated subject, the processor 32 tracks the designated subject using the captured video data recorded in the recording unit 33, according to the control command. When various kinds of control commands are acquired by the processor 32, the processor 32 may perform processes corresponding to the respective control commands.

The processor 32 repeatedly transmits the captured video data recorded in the recording unit 33 to the recording server 50 or the cloud server 70 through the wide-area communication unit 34 and the network NW1 (for example, Internet).

The recording unit 33 may include a semiconductor memory embedded in the camera 10 (for example, flash memory) or an external memory medium such as a memory card (for example, SD card), which is not embedded in the camera 10. The recording unit 33 may correlate the captured video data generated by the processor 32 with the identification information of the camera 10 (an example of the camera information) or the date and time information during capturing, and record the resultant data. Furthermore, the recording unit 33 may correlate the captured video data transmitted from the slave cameras (for example, the cameras 11 to 13) with the identification information of the slave cameras (an example of camera information) or the date and time information during capturing, and record the resultant data. The recording unit 33 normally pre-buffers and stores data of a video captured for a predetermined time, and continuously stores data of a video captured for a predetermined time (for example, 30 seconds) before the current time. When the recording unit 33 is configured as a memory card, the recording unit may be freely inserted into and removed from the casing of the camera 10.

The wide-area communication unit 34 is configured using a communication circuit. The wide-area communication unit 34 transmits the captured video data recorded in the recording unit 33 to the recording server 50 or the cloud server 70 through the wired network NW1 such as the Internet, based on an instruction of the processor 32. The wide-area communication unit 34 may receive a control command of the camera, transmitted from the outside (for example, the recording server 50 or the cloud server 70), or transmit status information of the camera to the outside (for example, the recording server 50 or the cloud server 70).

The local communication unit 35 is configured using a communication circuit. The local communication unit 35 may transmit the control command of the camera, received by the wide-area communication unit 34, to the slave cameras (for example, the cameras 11 to 13) through short range wireless communication, for example, or receive data of captured videos transmitted from the respective slave cameras (for example, the cameras 11 to 13).

The memory 36 is configured using a RAM and ROM, for example, and temporarily stores a program or data required for performing an operation of the camera 10 and information or data generated during the operation of the camera 10. The RAM is a work memory used during an operation of the processor 32, for example. The ROM stores a program and data for controlling the processor 32 in advance. The memory 36 stores identification information for identifying the camera 10 (for example, serial number) and various pieces of setting information.

FIG. 4 is a block diagram illustrating internal configurations of the recording server 50 and the retrieval terminal 90 according to the embodiments. The recording server 50 and the retrieval terminal 90 may be connected through the Intranet such as a wired LAN provided in the police station, or connected through a local wireless network (for example, wireless LAN).

The recording server 50 includes a communication unit 51, a storage unit 52, a video retrieval unit 53, a video analysis unit 54, a tag assignment unit 55, a pattern extraction unit 56 and a memory 57. The video retrieval unit 53, the video analysis unit 54, the tag assignment unit 55 and the pattern extraction unit 56 are configured as processors such as a CPU, MPU, DSP and FPGA, for example. The pattern extraction unit 56 may not be included in the recording server 50 according to the first embodiment.

The communication unit 51 is configured using a communication circuit. The communication unit 51 communicates with a master camera (for example, the camera 10 or 20) connected through the network NW1 such as the Internet, and receives a captured video transmitted from the master camera (that is, a video showing the situation at the intersection). The communication unit 51 communicates with the retrieval terminal 90 through a network such as the Intranet, provided in the police station, receives a request (instruction) transmitted from the retrieval terminal 90, or transmits a response to the request (instruction). The communication unit 51 transmits a part of the data of the captured video, stored in the storage unit 52, to the cloud server 70.

The storage unit 52 is configured as a hard disk drive (HDD) or solid state driver (SSD). The storage unit 52 correlates data of a captured video, transmitted from the master camera (for example, the camera 10 or 20), with the identification information of the camera having captured the video (an example of camera information) or the date and time information during capturing, and then records the resultant data. The storage unit 52 also records road map information including a plurality of intersections, for example, records updated road map information whenever the road map information is updated by a new construction of road. The storage unit 52 records intersection camera installation data indicating the corresponding relation between one or more cameras installed at each intersection and the intersection. The intersection camera installation data may be correlated with the identification information of the intersection and the identification information of the cameras. In the following descriptions, the same applies. Therefore, the storage unit 52 correlates the captured video data of the cameras with the camera information and the intersection information, and records the resultant data.

The video retrieval unit 53 retrieves captured video data satisfying a retrieval key among the captured video data recorded in the storage unit 52, based on a retrieval request (retrieval instruction) transmitted from the retrieval terminal 90 and containing the retrieval key, and transmits data of the retrieval result through the communication unit 51 such that the data are displayed on the output unit 94 of the retrieval terminal 90.

The video analysis unit 54 analyzes the captured video data recorded in the storage unit 52, and extracts and acquires information on a subject (for example, a person or vehicle) appearing in the captured video. The video analysis unit 54 may acquire information on subjects, and transmit the acquired information and the captured video data to the tag assignment unit 55 or record the acquired information and the captured video data, which is a video analysis target, in the storage unit 52. The information on subjects may include information on the type, color or number plate of a vehicle (for example, a getaway vehicle having caused an incident or accident), information capable of specifying a person in the vehicle, or information on the number of people in the vehicle.

The tag assignment unit 55 correlates the information on the video analysis result transmitted from the video analysis unit 54 (hereafter, referred to as 'tag information') with the captured video data set to a video analysis target by the video analysis unit 54, and records the resultant data in the storage unit 52. When assigning the tag information to the captured video data, the tag assignment unit 55 also correlates the captured video data with the date and time information of the captured video set to the video analysis target by the video analysis unit 54 and the identification information of the camera having captured the video, and records the resultant data in the storage unit 52. Accordingly, the recording server 50 can clearly determine the location of the intersection where the video was captured, the date and time information of the captured video, and the tag information assigned to the captured video.

The pattern extraction unit 56 determines whether vehicles have the same behavior patterns when routinely passing the intersection, using the tag information and the captured video data which are stored in the storage unit 52. When determining that the behavior patterns are present, the pattern extraction unit 56 records (stores) information on the behavior patterns as pattern information in the storage unit 52. For example, based on a histogram (frequency) of information on the dates and times at which each vehicle has passed the intersection, for the number of the number plate of the vehicle, the pattern extraction unit 56 extracts information on the date and time at which the peak of the histogram was acquired, as the pattern information.

The memory 57 is configured using a RAM and ROM, for example, and temporarily stores a program or data required for performing an operation of the recording server 50 and information or data generated during the operation of the recording server 50. The RAM is a work memory used during an operation of a processor PRC1, for example. The ROM stores a program and data for controlling the processor PRC1 in advance. The memory 57 stores identification information for identifying the recording server 50 (for example, serial number) and various pieces of setting information.

The retrieval terminal 90 includes an operation unit 91, a processor 92, a communication unit 93, an output unit 94 and a memory 95. The retrieval terminal 90 is used by an official in the police station, that is, an operator working as a policeman. When a witness to an event such as an incident or accident made a call to report the occurrence of the event, the operator responds to the call with a headset HDS worn on his head. The headset HDS is connected to the retrieval terminal 90, and collects voice generated by the operator or outputs voice of the reporter, transmitted through a telephone (not illustrated) through which the incoming call was made.

The operation unit 91 is an UI (User Interface) for detecting an input operation of the operator, and may include a mouse or keyboard. The operation unit 91 outputs a signal based on the input operation of the operator to the processor 92. When the operator wants to check the captured video of the intersection at the date and time that the operator wants to investigate, the operation unit 91 receives an input of a retrieval key containing the date and time information and the intersection information (for example, the location information of the intersection). Furthermore, when the operator wants to check a captured video of a vehicle (for example, a getaway vehicle) at the date and time that the operator wants to investigate, the operation unit 91 receives an input of a retrieval key containing the date and time information and vehicle information (for example, the type or color of the vehicle).

The processor 92 is configured using a CPU, MPU, DSP or FPGA, for example, functions as a control unit of the retrieval terminal 90, performs a control process of controlling overall operations of the respective units of the retrieval terminal 90, a data input/output process among the respective units of the retrieval terminal 90, a data calculation process and a data storage process. The processor 92 operates according to a program and data stored in the memory 95. The processor 92 uses the memory 95 during operation, and acquires the current time information or displays retrieval result data for various captured videos on the output unit 94, the retrieval result data being transmitted from the recording server 50 or the cloud server 70. In response to the input of the retrieval key transmitted from the operation unit 91, the processor 92 generates a retrieval request (retrieval instruction) including the retrieval key and transmits the retrieval request (retrieval instruction) to the recording server 50 or the cloud server 70 through the communication unit 93.

The communication unit 93 is configured using a communication circuit. The communication unit 93 communicates with the cloud server 70 connected through a network NW3 such as the Internet, and receives various captured videos transmitted from the cloud server 70 (for example, a captured video requested by the retrieval terminal 90). The communication unit 93 communicates with the recording server 50 through a network such as the Intranet, provided in the police state, and transmits a retrieval request (instruction) for various captured videos to the recording server 50), or receives a response to the request (instruction). The various captured videos may include a captured video of a vehicle or intersection which the operator wants to investigate.

The output unit 94 is configured using a display such as an LCD (Liquid Crystal Display) or organic EL (Electroluminescence), for example, and displays various captured video data transmitted from the processor 92. The output unit 94 may also be configured as a speaker, for example, and output a voice signal sent from the processor 92 (for example, a predetermined warning sound generated when a report call was received from a telephone (not illustrated).

The memory 95 is configured using a RAM and ROM, for example, and temporarily stores a program or data required for performing an operation of the retrieval terminal 90 and information or data generated during the operation of the retrieval terminal 90. The RAM is a work memory used during an operation of the processor 92, for example. The ROM stores a program and data for controlling the processor 92 in advance. The memory 95 stores identification information for identifying the retrieval terminal 90 (for example, serial number) and various pieces of setting information.

Figure 5:
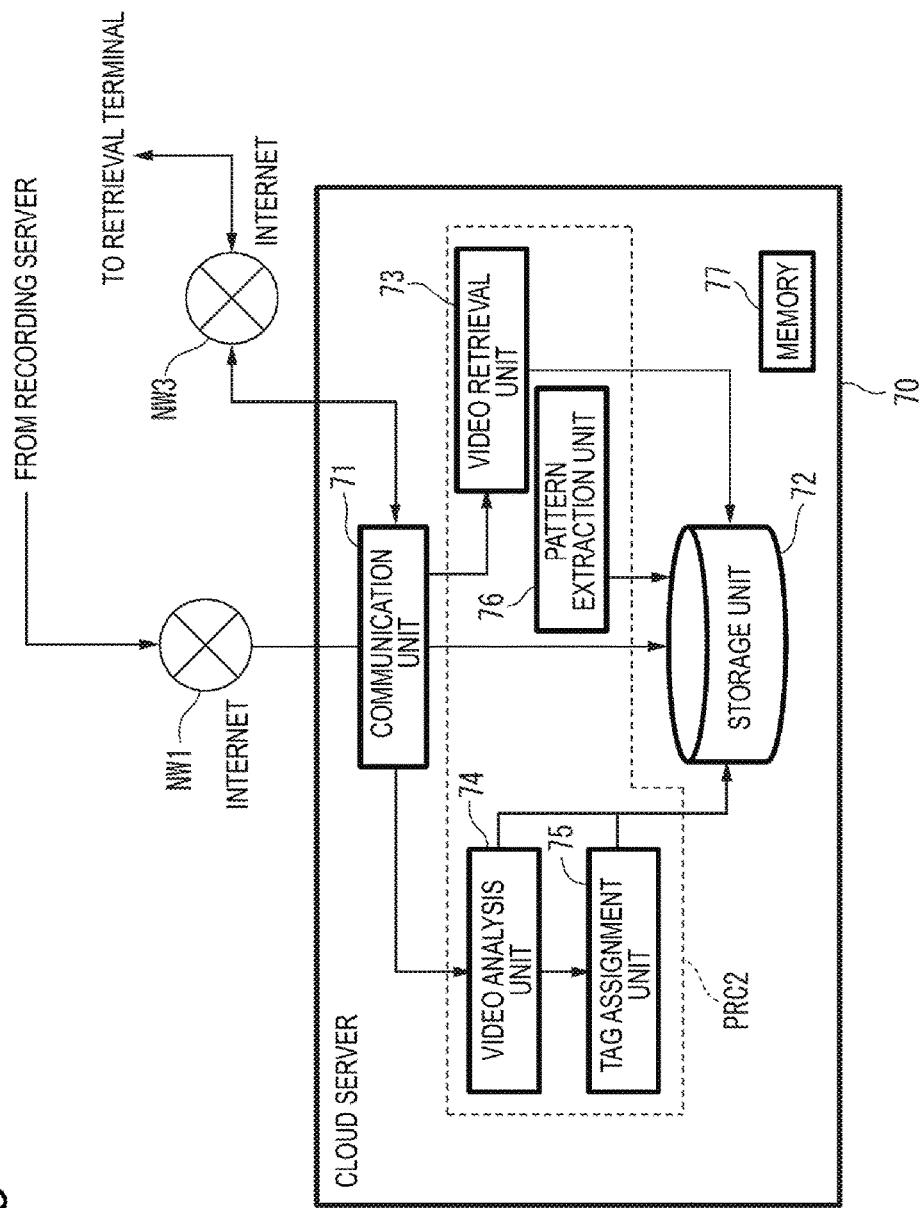
FIG. 5 is a block diagram illustrating an example of an internal configuration of a cloud server according to embodiments.

FIG. 5 is a block diagram illustrating an internal configuration of the cloud server 70 according to the embodiments. The cloud server 70 is connected so as to communicate with the recording server 50 through the network NW1 such as the Internet, and connected so as to communicate with the retrieval terminal 90 through the network NW3 such as the Internet.

The cloud server 70 includes a communication unit 71, a storage unit 72, a video retrieval unit 73, a video analysis unit 74, a tag assignment unit 75, a pattern extraction unit 76 and a memory 77. The video retrieval unit 73, the video analysis unit 74, the tag assignment unit 75 and the pattern extraction unit 76 are configured as processors such as a CPU, MPU, DSP and FPGA, for example. The pattern extraction unit 76 may not be included in the cloud server 70 according to the first embodiment.

The communication unit 71 is configured using a communication circuit. The communication unit 71 performs communication with the recording server 50 connected through the network NW1 such as the Internet, and receives a captured video transmitted from the recording server 50. The captured video may include a captured video designated through an operation of a terminal (not illustrated) used by a manager, for example, a captured video of an important or serious incident. The communication unit 71 performs communication with the retrieval terminal 90 through the network NW3 such as the Internet, and receives a request (instruction) transmitted from the retrieval terminal 90, or transmits a response to the request (instruction).

The storage unit 72 is configured using a HDD or SSD, for example. The storage unit 72 correlates captured video data transmitted from the master camera (for example, the camera 10 or 20) or the recording server 50 with the identification information of the camera having captured the video (an example of camera information) or the date and time information during capturing, and records the resultant data. The storage unit 72 may also record road map information including a plurality of intersections, or record updated road map information whenever the road map information is updated by a new construction of road. The storage unit 72 records intersection camera installation data indicating the corresponding relation between one or more cameras installed at each intersection and the intersection. Therefore, the storage unit 72 correlates the captured video data of the cameras with the camera information and the intersection information, and records the resultant data.

Based on a retrieval request (retrieval instruction) transmitted from the retrieval terminal 90 and containing a retrieval key, the video retrieval unit 73 retrieves captured video data satisfying the retrieval key among the captured video data recorded in the storage unit 72, and transmits data of the retrieval result through the communication unit 51 such that the data are displayed on the output unit 94 of the retrieval terminal 90.

The video analysis unit 74 analyzes the captured video data recorded in the storage unit 72, and extracts and acquires information on a subject (for example, a person or vehicle) appearing in the captured video. The video analysis unit 74 may acquire information on subjects, and transmit the acquired information and the captured video data set to the video analysis target to the tag assignment unit 75 or record the acquired information and the captured video data in the storage unit 72. The information on the subjects may include information on the type or color of a vehicle (for example, a getaway vehicle having caused an incident or accident), or information capable of specifying a person in the vehicle.

The tag assignment unit 75 correlates the information (tag information) on the video analysis result transmitted from the video analysis unit 74 with the captured video data set to the video analysis target by the video analysis unit 74, and records the resultant data in the storage unit 72. When assigning the tag information to the captured video data, the tag assignment unit 75 also correlates the captured video data with the date and time information of the captured video set to the video analysis target by the video analysis unit 74 or the identification information of the camera having captured the video, and records the resultant in the storage unit 72. Accordingly, the recording server 70 can clearly determine the location of an intersection where a video was captured, the date and time information of the captured video, and tag information assigned to the captured video.

The pattern extraction unit 76 determines whether vehicles have the same behavior patterns when routinely passing an intersection, using the tag information and the captured video data which are recorded in the storage unit 72. When determining that the behavior patterns are present, the pattern extraction unit 76 records (stores) information on the behavior patterns as pattern information in the storage unit 72. For example, based on a histogram (frequency) of information on the dates and times at which each vehicle has passed the intersection, for the number of the number plate of the vehicle, the pattern extraction unit 76 extracts information on the date and time at which the peak of the histogram was acquired, as the pattern information.

The memory 77 is configured using a RAM and ROM, for example, and temporarily stores a program or data required for performing an operation of the cloud server 70 and information or data generated during the operation of the cloud server 70. The RAM is a work memory used during an operation of a processor PRC2, for example. The ROM stores a program and data for controlling the processor PRC2 in advance. The memory 77 stores identification information for identifying the cloud server 70 (for example, serial number) and various pieces of setting information.

Figure 6:
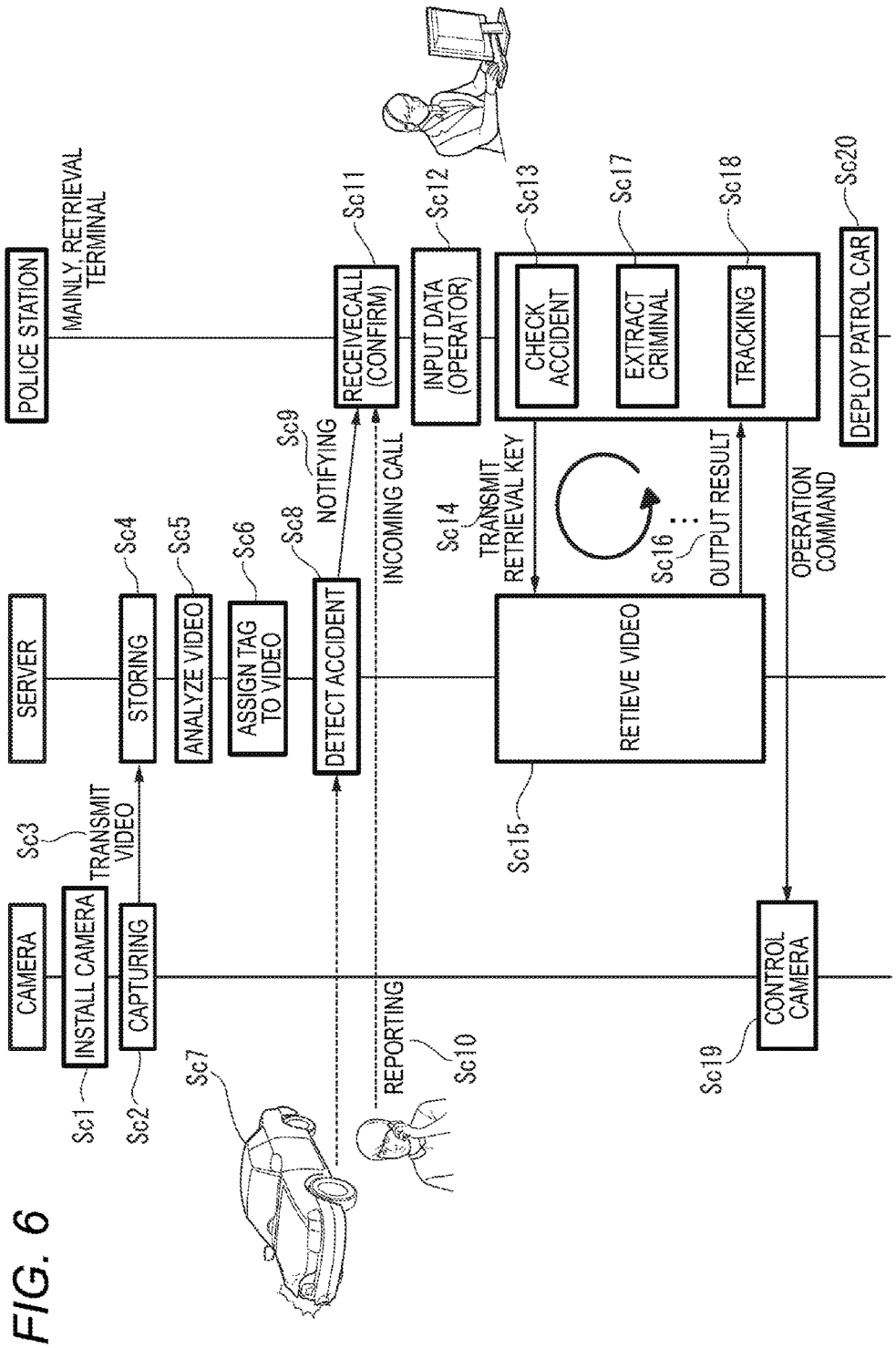
FIG. 6 is a sequence diagram illustrating an operation procedure example of an investigation scenario in the investigation assist system according to the embodiments.

FIG. 6 is a sequence diagram illustrating an operation procedure of an investigation scenario in the investigation assist system 100 according to the embodiments. The investigation scenario illustrated in FIG. 6 shows an example of an operation procedure (use case) which the investigation assist system 100 performs when tracking the whereabouts of a vehicle driven by a suspect or criminal in real time after an event such as an incident or accident occurred in or around an intersection, for example.

In FIG. 6, a camera may be set to a master camera (for example, the camera 10 or 20 of FIG. 1) or a slave camera (for example, the slave camera 11, 12, 13, 21, 22 or 23 of FIG. 1). However, a camera transmitting a captured video to a server at step Sc3 is the master camera. The server is the recording server 50 or the cloud server 70 constituting the investigation assist system 100. The police station may indicate various office devices installed in the police station (for example, the retrieval terminal 90, a telephone (not illustrated) and a headset HDS).

In FIG. 6, the camera is installed at a predetermined position of the intersection so as to satisfy a predetermined view angle at step Sc1. For example, the camera is installed on the pole of a traffic signal at the intersection or the traffic signal. When the installation of the camera is ended, the camera starts capturing at step Sc2, and records the captured video in the memory (for example, the memory 45 or 36). The camera transmits data of a video acquired through the capturing operation started at step Sc2 to the server (for example, the recording server 50) at step Sc3.

When receiving the captured video data transmitted from the camera at step Sc3, the server records (stores) the captured video data in the storage unit (for example, the storage unit 52 or 72) at step Sc4. The server performs video analysis using the recorded captured video data at step Sc5. The video analysis may be performed by the server whenever the captured video data are recorded in the storage unit (for example, the storage unit 52 or 72). However, the timing of the video analysis is not limited to the recording timing, but the video analysis may be performed whenever an analysis request (analysis command) transmitted from the retrieval terminal 90 is received by the server, or performed at each predetermined interval. The server can detect an occurrence of an event such as an incident or accident in or around the intersection through the analysis of the captured video.

After performing the video analysis at step Sc5, the server correlates tag information acquired through the video analysis with the captured video data, and records (stores) the resultant data in the storage unit (for example, the storage unit 52 or 72) at step Sc6.

Here, suppose that an accident occurred due to a driving error such as a driver's negligence in keeping eyes forward and the driver got away from the accident site, at step Sc7.

The server detects the occurrence of the accident through the video analysis of step Sc6 at step Sc8, and reports the occurrence of the accident to the search terminal 90 in the police station through the network NW1 such as the Internet at step Sc9. Moreover, suppose that a witness having witnessed the occurrence of the accident at step Sc7 made a call to the police station at step Sc10, in order to report the occurrence of the accident to the police station. The call for reporting the occurrence of the accident at step Sc10 causes an incoming call in the police station.

When an operator in the police station confirms (receives) the incoming call of the report and starts to responds to the call at step Sc1, the operator starts to hear various pieces of information about the accident from the witness having reported the accident, and inputs various pieces of information acquired through the hearing as data while using the retrieval terminal 90, at step Sc12.

When hearing the occurrence site or the date and time information of the accident, for example, the operator inputs the occurrence site or the date and time information as a retrieval key to the retrieval terminal 90. Based on an operation of the operator who wants to check a captured video of the accident site at step Sc13, the retrieval terminal 90 transmits a retrieval request (retrieval instruction) containing the input retrieval key to the server (for example, the recording server 50 or the cloud server 70) at step Sc14.

When receiving the retrieval request (request instruction) containing the retrieval key at step Sc14, the server retrieves captured video data satisfying the retrieval key among the captured video data recorded (stored) in the storage unit (for example, the storage unit 52 or 72) at step Sc15. The server transmits the retrieval result to the retrieval terminal 90 at step Sc16, the retrieval result including the captured video data retrieved at step Sc15.

The retrieval terminal 90 receives the retrieval result transmitted from the server at step Sc16, and displays the retrieval result on the output unit 94. Accordingly, the operator can check a captured video on the output unit 94, the captured video satisfying the various pieces of information heard from the witness having reported the occurrence of the accident at step Sc10 (for example, the accident site or the date and time information), and extract information on the criminal having caused the accident through visual confirmation of the captured video displayed on the output unit 94 at step Sc17. The operator further includes information as the retrieval key, the information being additionally heard about the accident from the witness having reported the accident, and transmits a retrieval request (retrieval command) including the retrieval key to the server (for example, the recording server 50 or the cloud server 70) at step Sc14. In this way, steps Sc14 to Sc16 are repeated. Therefore, the operator using the retrieval terminal 90 can track the vehicle driven by the criminal having caused the accident at step Sc18.

The retrieval terminal 90 generates a control command (operation command) for changing the capturing condition of the camera (for example, the capturing direction or zoom magnification) according to an operation of the operator, and transmits the control command to the corresponding camera through the server at step Sc19. The operator using the retrieval terminal 90 prepares the deployment of a patrol car in order to dispatch policemen to the accident site, for example, at step Sc20.

Figure 7B:
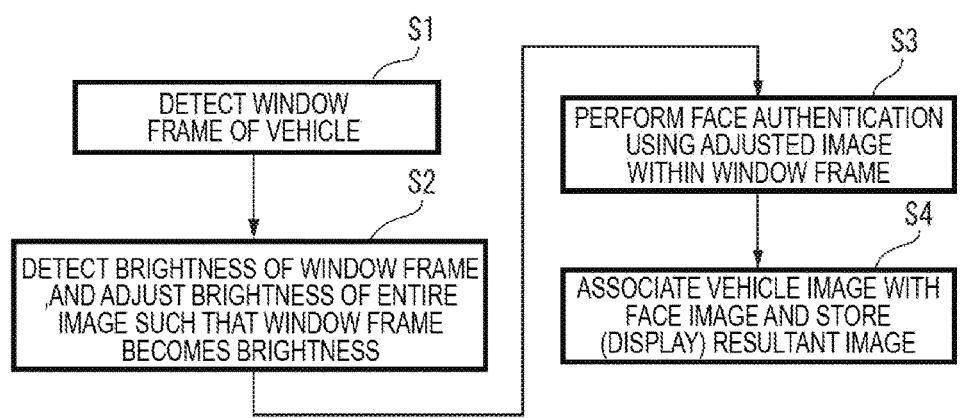
FIG. 7B is a flowchart illustrating a procedure example of the image processing in the recording server or the cloud server according to the first embodiment.

FIG. 7A is a diagram for describing an image processing operation of the recording server 50 or the cloud server 70 according to the first embodiment. FIG. 7B is a flowchart illustrating a procedure of the image processing operation in the recording server 50 or the cloud server 70 according to the first embodiment. The procedure of the image processing operation in FIG. 7B corresponds to step Sc5 of the investigation scenario in FIG. 6. In the descriptions of FIG. 7B with reference to FIG. 7A, the image processing operation is performed by the recording server 50. However, the image processing operation may be performed by the cloud server 70.

In FIG. 7B, the video analysis unit 54 constituting the processor PRC1 of the recording server 50 reads captured video data recorded (stored) in the storage unit 52 and analyzes the read video data, thereby detecting a vehicle and a window frame FRG1 of the vehicle which appear in various images IMG1 constituting the captured video, at step S1. For example, the video analysis unit 54 recognizes the position of the number plate of the vehicle, using a publicly technique for recognizing the number plate of a vehicle, and determines that a predetermined area formed at a predetermined distance upward from the position is a window frame. The video analysis unit 54 may recognize a vehicle using a publicly technique for detecting a moving subject, and determine that a specific position of the vehicle is a window frame.

The video analysis unit 54 detects the brightness of the window frame FRG1 detected at step S1, and adjusts the brightness of the entire image IMG1 such that the window frame FRG1 becomes bright or a predetermined value or more of brightness can be acquired, at step S2. The video analysis unit 54 may adjust the brightness of the entire image IMG1 at step S2, or adjust only the brightness of the detected window frame FRG1.

The video analysis unit 54 detects the window frame FRG2 in the image IMG2 adjusted at step S2, and detects a face image FC1 of a person in the vehicle (for example, the criminal having caused the incident or accident), using an image within the window frame FRG2. The video analysis unit 54 cuts out the detected face image FC1 from the image IMG2 and performs face authentication, at step S3. The face authentication process is to determine whether the face image FC1 detected within the window frame FRG2 of the image IMG2 has a plurality of feature points appearing in the face of the person, and a publicly technique may be used for the face authentication process.

After step S3, the video analysis unit 54 correlates the data of the image IMG1 constituting the captured video read at step S1 (the original image corresponding to the video analysis target) with the face image FC1 within the window frame FRG2, which was determined to be the face of the person as the result of the face authentication at step S3, and records (stores) the correlated data in the storage unit 52, at step S4. Furthermore, the video analysis unit 54 may correlate the image IMG1 and the face image FC1, which are stored in the storage unit 52 at step S4, with the captured video data set to the video analysis target, and record (store) the correlated data in the storage unit 52. Moreover, the video analysis unit 54 may transmit the image IMG1 and the face image FC1, which are stored in the storage unit 52 at step S4, as the analysis result through the communication unit 51, such that the analysis result is displayed on the output unit 94 of the retrieval terminal 90. Therefore, the operator can see the analysis result displayed on the output unit 94, correctly recognize the face image of the criminal sitting in the front seat of the vehicle within the captured video in which the face of the criminal is difficult to confirm in most cases, and correctly transfer the features of the criminal face to a policeman heading for the incident or accident site, which makes it possible to improve the efficiency of the initial investigation by the policeman.

In the above-described investigation assist system 100 according to the first embodiment, the recording server 50 or the cloud server 70 (an example of the investigation assist device) are connected to the cameras installed at each of the plurality of intersections so as to communicate with the cameras, and acquire captured images of the cameras installed at an intersection where an event such as an incident or accident occurred, among the plurality of intersections, through the communication unit 51 or 71. The recording server 50 or the cloud server 70 detects a vehicle involved in the occurrence of the event (for example, the vehicle having caused the incident or accident) and the window frame of the vehicle through the video analysis unit 54 or 74 (an example of a detection unit), based on the acquired captured images of the cameras. The recording server 50 adjusts the brightness of the image within the detected window frame of the vehicle through the video analysis unit 54 or 74 (an example of an adjusting unit) such that the brightness becomes equal to or more than a predetermined value. The recording server 50 extracts the face image of the person in the vehicle involved in the occurrence of the event through the video analysis unit 54 or 74 (an example of an extraction unit), based on the adjusted image within the window frame. The video analysis unit 54 or 74 correlates the extracted face image with the acquired camera image, and stores the resultant data in the storage unit 52 or 72.

Accordingly, when an incident or accident occurred at an intersection where many people or vehicles come and go, the recording server 50 or the cloud server 70 can extract a face image of a person in a getaway vehicle with high precision, and efficiently assist finding the suspect or criminal of the incident or accident in early stage.

When the entire brightness of the acquired camera image is equal to or more than the predetermined value, the recording server 50 or the cloud server 70 may start detecting the vehicle involved in the occurrence of the event and the window frame of the vehicle through the video analysis unit 54 or 74. Accordingly, the recording server 50 or the cloud server 70 can detect a vehicle and the window frame of the vehicle, appearing in a captured video of the camera, only during a period of time in which the entire brightness of the captured video of the camera is equal to or more than a predetermined value (for example, a period of time in the daytime), which makes it possible to improve the efficiency of the video analysis.

Background to Second Embodiment

In JP-A-2007-174016, the camera image information captured by the plurality of cameras is displayed on the display device in the terminal device mounted on the vehicle. Therefore, a user (for example, driver) can check real-time images at the places where the respective cameras are disposed. However, in JP-A-2007-174016, it is not considered to extract the details of an event such as an occurrence location and inform an operator of the extracted details, when the event such as an incident or accident occurred around a traveling route of a vehicle (for example, an intersection where many pedestrians or vehicles come and go). In particular, a reporter of the event such as an incident or accident may not correctly describe where the reporter is. In this case, an operator in a police station has to ask detailed information such as the occurrence location of the event. For this reason, although the technique described in JP-A-2007-174016 is used when the event such as an incident or accident occurred, the operator within the police station, having received the report, may require labor and time to acquire detailed information such as the occurrence location of the event such as an incident or accident, thereby having difficulties in finding the suspect or criminal of the incident or accident in early stage.

Therefore, the following second embodiment provides an investigation assist system and an investigation assist method which can correctly extract a related video suitable for information received from a reporter, ask the reporter about detailed information, and assist finding the suspect or criminal of an incident or accident in early stage, when the incident or accident occurred around an intersection where many people and vehicles come and go.

Second Embodiment

Since the investigation assist system according to the second embodiment has the same configuration as the investigation assist system 100 according to the first embodiment, the same components are represented by like reference numerals, the detailed descriptions thereof are simplified or omitted, and the following descriptions will be focused on different components.

FIG. 8 is a sequence diagram illustrating the procedure of an operation of inputting report contents through the retrieval terminal 90 and an operation of retrieving an image through the recording server 50 according to the second embodiment. A large portion of the operation procedure illustrated in FIG. 8 is duplicated with the contents of the investigation scenario illustrated in FIG. 6, and performed at steps Sc2 to Sc18.

In FIG. 8, a camera may be set to a master camera (for example, the camera 10 or 20 of FIG. 1) or a slave camera (for example, the slave camera 11, 12, 13, 21, 22 or 23 of FIG. 1). At step S12, however, a camera transmitting a captured video to a server is the master camera. The server is the recording server 50 or the cloud server 70 constituting the investigation assist system 100. The police station may indicate the retrieval terminal 90 installed in the police station.

In FIG. 8, the camera starts capturing, and records the captured video in a memory (for example, the memory 45 or 36) at step S11. The camera transmits the captured video data acquired through the capturing operation to the server (for example, the recording server 50) at step S12. The server receives the captured video data transmitted from the camera at step S12, and records (stores) the captured video data in the storage unit (for example, the storage unit 52 or 72) at step S13. The server performs video analysis using the recorded captured video data.

Here, suppose that an accident occurred due to a driving error such as a driver's negligence in keeping eyes forward, and the driver ran away while driving an accident vehicle TRC1.

The server detects the occurrence of the accident through video analysis at step S14, extracts data of a video related to the accident (accident-related video) through the network NW1 such as the Internet at step S15, and notify the extracted data of the accident-related video to the retrieval terminal 90 in the police station at step S16. The retrieval terminal 90 receives the data of the accident-related video, transmitted from the server at step S16, at step S17. Furthermore, suppose that a witness having witnessed the occurrence of the accident made a call to the police station at step S18, in order to report the occurrence of the accident to the police station. The call for reporting the occurrence of the accident at step S18 causes an incoming call to the police station, and an operator using the retrieval terminal 90 receives the call of the report at step S19.

When the operator in the police station confirms (receives) the incoming call of the report and starts to respond to the call, the operator starts to hear various pieces of information about the accident from the witness having reported the accident, and inputs the various pieces of information acquired through the hearing as data while using the retrieval terminal 90, at step S20. The report contents input at step S20 include a retrieval key used to request the server to retrieve a video, the retrieval key including the type or color of the accident vehicle TRC1 or the date and time information of the accident.

When hearing the occurrence site or the date and time information of the accident, for example, the operator inputs the occurrence site or the date and time information as a retrieval key to the retrieval terminal 90. The retrieval key may be input through a keyboard or the like of the operation unit 91 by the operator. Furthermore, when the operator has a conversation with the witness through a headset HDS, the processor 92 may acquire conversation voice from the headset HDS, recognize the conversation contents, and automatically generate a retrieval key. The retrieval terminal 90 retrieves the accident-related video received at step S17 using a retrieval request (retrieval instruction) including the input retrieval key, and displays the corresponding accident video, based on an operation of the operator who wants to check the captured video of the accident site, at step S21. Therefore, the operator can have a conversation with the witness while watching the displayed accident video, and check whether the displayed image is identical to the accident witnessed by the witness, based on the neighboring buildings or the accident situation. In this way, even when the witness cannot correctly describe the current location of the witness, the operator can check the location of the witness within a short time. When the witness cannot describe the incident or accident site, the operator inevitably asks information on the incident or accident site. In the present embodiment, however, the incident or accident site detected by the camera is shown as a candidate to the operator. Thus, the operator can easily narrow down the site. For example, suppose that an incident or accident was detected by cameras at two different points (for example, points AA and BB) during a period of time in which a report was received. When the witness knows the color of the vehicle having caused the incident or accident but does not know the place where the incident or accident occurred, since accident images of the points AA and BB have been sent to the police station at step S17, the operator checks a retrieval result obtained by a retrieval operation (for example, a retrieval operation using the color of the vehicle as a retrieval key) through the operation unit 91 from an image displayed on the output unit 94 of the retrieval terminal 90. Thus, it is possible to improve the possibility that the location of the witness can be specified to any one of the points AA and BB.

The retrieval terminal 90 receives an input of more information (report contents) of the accident site which the operator has known through the report from the witness, at step S22. Based on an operation of the operator who wants to check more captured videos of the accident site, the retrieval terminal 90 transmits a retrieval request (retrieval instruction) containing the retrieval key input at step S22 to the server (for example, the recording server 50 or the cloud server 70) at step S23.

When receiving the retrieval request (retrieval instruction) containing the retrieval key transmitted at step S23, the server retrieves captured video data satisfying the retrieval key among the captured video data recorded (stored) in the storage unit (for example, the storage unit 52 or 72) at step S24. The server transmits a retrieval result to the retrieval terminal 90 at step S25, the retrieval result including the captured video data retrieved at step S24.

The retrieval terminal 90 receives the retrieval result transmitted from the server at step S25 as the accident video and displays the accident video on the output unit 94 at step S26, the retrieval result including a captured video of the intersection, corresponding to the date and time information of the accident. Accordingly, the operator can check the accident video on the output unit 94, the accident video satisfying the various pieces of information acquired from the witness having reported the occurrence of the accident at step S18 (for example, the accident site or the date and time information of the accident), and extract information on the criminal having caused the accident from the accident video displayed on the output unit 94. The operator includes the information in the retrieval key at step S22, the information being additionally heard about the accident from the witness having reported the accident, and transmits a retrieval request (retrieval instruction) including the retrieval key to the server (for example, the recording server 50 or the cloud server 70) at step S23. In this way, steps S22 to S26 are repeated. Therefore, the operator using the retrieval terminal 90 can track the accident vehicle TRC1 driven by the criminal having caused the accident, or visually check the feature information of the accident vehicle TRC1 in detail. Furthermore, steps S20 and S22 may be performed at the same time. When the witness could correctly describe an accident site, steps S20 and S21 may be omitted.

In the investigation assist system 100 according to the second embodiment, when the recording server 50 or the cloud server 70 (an example of the investigation assist device) detects an occurrence of an event such as an incident or accident at a first point (for example, an intersection) based on an acquired captured video of a camera, the recording server 50 or the cloud server 70 transmits the captured video of the camera to the retrieval terminal 90, the captured video being acquired at the point of time that the event was detected. The retrieval terminal 90 (an example of an operator terminal) records the captured video of the camera, transmitted from the recording server 50 or the cloud server 70, in the storage unit 52 or 72, and transmits report contents information input on the basis of the report indicating the occurrence of the event to the recording server 50 or the cloud server 70, the report contents information indicating a retrieval request (retrieval instruction) including the retrieval key. The recording server 50 or the cloud server 70 extracts a captured video satisfying the report contents information transmitted from the retrieval terminal 90, and transmits the extracted video to the retrieval terminal 90. The retrieval terminal 90 displays the video received from the recording server 50 or the cloud server 70 on the output unit 94.

Accordingly, when an event such as an incident or accident occurred in or around an intersection where many people and vehicles come and go, the recording server 50 or the cloud server 70 can correctly extract and display a related video suitable for the information delivered by the reporter (for example, a live video of a camera at the occurrence site of the event). Therefore, the retrieval terminal 90 can ask the reporter about the detailed information, and assist finding the suspect or criminal of the incident or accident in early stage. In other words, while the live video of the camera at the occurrence site of the event is displayed on the output unit 94, the operator can ask the witness more specific questions about the occurrence of the event.

The retrieval terminal 90 transmits the input report contents information to the recording server 50 or the cloud server 70, whenever the report contents information based on the report is input. The recording server 50 or the cloud server 70 extracts captured video data satisfying the report contents information transmitted from the retrieval terminal 90, and transmits the extracted video data to the retrieval terminal 90. Accordingly, the retrieval terminal 90 can further include information as the retrieval key, the information being additionally heard about the accident from the witness having reported the accident. Furthermore, the retrieval terminal 90 can narrow down the captured video data satisfying the plurality of input retrieval keys, and track the accident vehicle TRC1 driven by the criminal having caused the accident, or visually check the feature information of the accident vehicle TRC1 in detail.

Background to Third Embodiment

In JP-A-2007-174016, the camera image information captured by the plurality of cameras is displayed on the display device in the terminal device mounted on the vehicle. Therefore, a user (for example, driver) can check real-time images at the locations where the respective cameras are disposed. However, in JP-A-2007-174016, it is not considered to multilaterally display videos captured by a plurality of cameras installed around an intersection, when the event occurred around the traveling route of the vehicle (for example, an intersection where many people and vehicles come and go). In particular, when an event such as an incident or accident occurred, information indicating in which direction a vehicle involved in the occurrence of the event (for example, a getaway vehicle) ran away is important for the initial investigation. For this reason, although the technique described in JP-A-2007-174016 is used when the event such as an incident or accident occurred, an operator of a police station, having received a report on the occurrence of the event, cannot acquire information in early stage, the information indicating in which direction the vehicle involved in the occurrence of the event such as an incident or accident (for example, getaway vehicle) ran away, and has difficulties in finding the suspect or criminal of the incident or accident in early stage.

Therefore, the following third embodiment provides an operator terminal and a video display method, which can multilaterally display videos captured by a plurality of cameras, enable an operator to visually acquire information indicating in which direction a vehicle involved in an occurrence of an incident or accident ran away, and assist finding the suspect or criminal of the incident or accident in early stage, when the incident or accident occurred in an intersection where many people and vehicles come and go.

Third Embodiment

Since the investigation assist system according to the third embodiment has the same configuration as the investigation assist system 100 according to the first embodiment, the same components are represented by like reference numerals, the detailed descriptions thereof are simplified or omitted, and the following descriptions will be focused on different components.

Figure 10A:
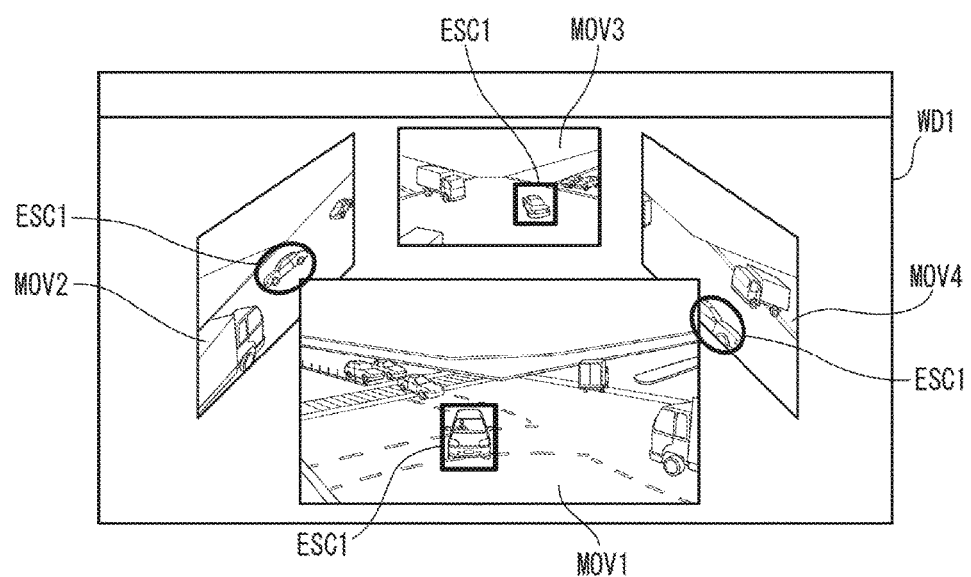
FIG. 10A is a view illustrating a display example of images captured by the plurality of cameras according to the first display method.
Figure 10B:
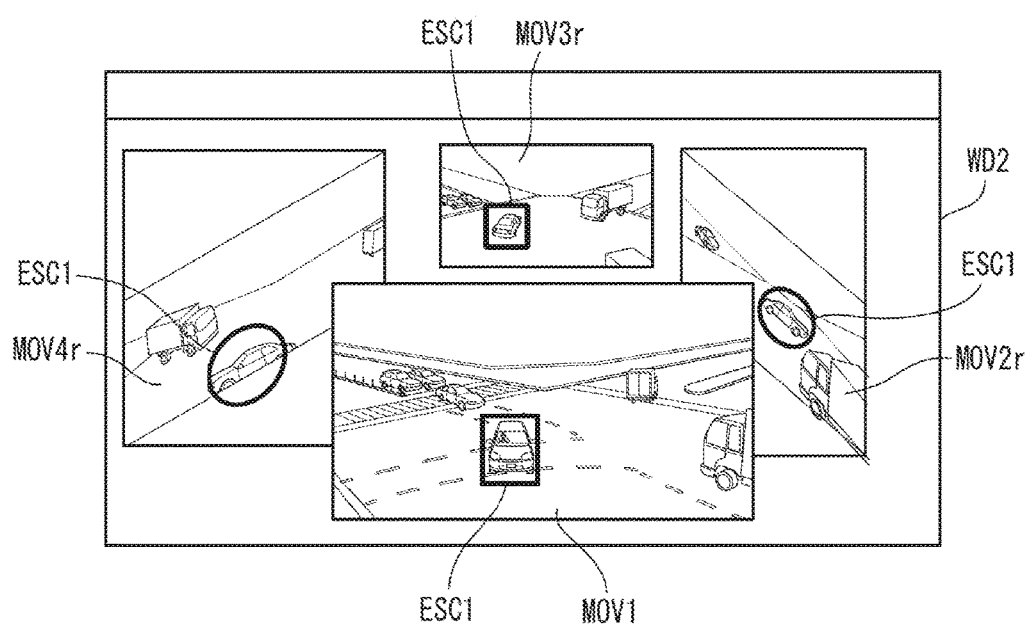
FIG. 10B is a view illustrating a display example of images captured by the plurality of cameras according to the second display method.

FIG. 9A illustrates that a plurality of cameras C1 to C4 are arranged at an intersection INTC0 and videos captured by the respective cameras C1 to C4 are displayed on one screen. FIG. 9B is a table for describing first and second display methods according to the third embodiment. FIG. 10A illustrates that the images captured by the cameras C1 to C4 are displayed according to the first display method. FIG. 10B illustrates that the images captured by the cameras C1 to C4 are displayed according to the second display method. The display examples of the captured videos in FIGS. 10A and 10B correspond to a specific example in which the retrieval terminal 90 receives the captured videos and then displays the videos on the output unit 94 at step Sc16 of the investigation scenario illustrated in FIG. 6.

As illustrated in FIG. 9A, the cameras C1 and C3 are installed to face each other across the intersection INTC0, and the cameras C2 and C4 are installed to face each other with the intersection INTC0 interposed therebetween. The cameras C1 to C4 are fixedly installed on poles PI1 to PI4 on which traffic signals are respectively installed.

The retrieval terminal 90 (an example of the operator terminal) according to the third embodiment receives data of videos captured by the plurality of cameras C1 to C4 from the recording server 50 or the cloud server 70, and displays the captured video data on the output unit 94. The cameras C1 to C4 may correspond to the cameras 10 to 13 or the cameras 20 to 23 illustrated in FIG. 1. In any case, the cameras C1 to C4 correspond to a plurality of cameras installed around the same intersection INTC0. In the third embodiment, when the retrieval terminal 90 displays the captured video data on one screen of the output unit 94, the captured video data are displayed on one screen through an arrangement based on the first display method (refer to FIG. 10A) or the second display method (refer to FIG. 10B).

First, the first display method will be described.

For example, suppose that the operator wants to check a captured video in a direction corresponding to a viewpoint YJ1 of FIG. 9A, when videos captured by four cameras are displayed on the output unit 94. Furthermore, suppose that the operator performed an operation of setting the viewpoint YJ1 to an observation direction, using the operation unit 91. According to the operation of the operator, the retrieval terminal 90 displays captured videos GM1 to GM4 of the cameras C1 to C4 on one screen in the output unit 94. Specifically, the captured video GM1 of the camera C1 (refer to a screen A) is disposed with the largest size, and the captured video GM3 of the camera C3 (refer to a screen C) is disposed with a smaller size than the captured video GM1 of the camera C1. Furthermore, the captured video GM2 of the camera C2 (refer to a screen B) is distorted and positioned at the left side of the captured video GM1 of the camera C1, and the captured video GM4 of the camera C4 (refer to a screen D) is distorted and positioned at the right side of the captured video GM1 of the camera C1 (refer to right side of FIG. 9A).

In the first display method, the above-described screen arrangement of the captured videos is set based on the positional relation among the cameras which are actually arranged in accordance with the viewpoint YJ1.

Specifically, in accordance with the viewpoint YJ1, the position of the camera C1 corresponds to a position to which the operator pays the most attention. Therefore, a display region for the captured video GM1 of the camera C1 has the largest area. Furthermore, in accordance with the viewpoint JY1, the camera C3 is installed at the opposite side of the camera C1 with the intersection INTC0 interposed therebetween. Therefore, the captured video GM3 of the camera C3 is disposed above the captured video GM1 so as to face the captured video GM1 when the captured video GM3 is displayed on the output unit 94. Moreover, when seen from the viewpoint YJ1, the camera C2 is installed at the left side of the camera C1 (the left side in FIG. 9A). Therefore, the captured video GM2 of the camera C2 is disposed at the left top of the captured video GM1 when the captured video GM2 is displayed on the output unit 94. Finally, when seen from the viewpoint YJ1, the camera C4 is installed at the right side of the camera C1 (the right side in FIG. 9A). Therefore, the captured video GM4 of the camera C4 is disposed at the right top of the captured video GM1 when displayed on the output unit 94.

The captured video GM2 of the camera C2 is distorted and displayed in such a manner that a portion of the captured video at the left view angle in the optical axis direction during capturing of the camera C2 becomes a lower end portion, and a portion of the captured video at the right view angle in the optical axis direction during capturing of the camera C2 becomes an upper end portion. The distortion process may be performed by the processor 92 of the retrieval terminal 90, or performed by the processors PRC1 and PRC2 of the recording server 50 and the cloud server 70.

The captured video GM4 of the camera C4 is distorted and displayed in such a manner that a portion of the captured video at the left view angle in the optical axis direction during capturing of the camera C4 becomes a lower end portion, and a portion of the captured video at the right view angle in the optical axis direction during capturing of the camera C4 becomes an upper end portion. The distortion process may be performed by the processor 92 of the retrieval terminal 90, or performed by the processors PRC1 and PRC2 of the recording server 50 and the cloud server 70.

In the first display method as shown in FIG. 9B, the captured video GM1 of the camera C1 corresponding to the screen A is displayed without a particular distortion process. The captured video GM2 of the camera C2 corresponding to the screen B is distorted and displayed in the above-described manner. The captured video GM3 of the camera 3 corresponding to the screen C is not subjected to the above-described distortion process, but resized to a smaller size than the captured video GM1 and then displayed. The captured video GM4 of the camera C4 corresponding to the screen B is distorted and displayed in the above-described manner.

FIG. 10A illustrates one screen WD1 displayed on the output unit 94 of the retrieval terminal 90, the screen WD1 showing videos MOV1 to MOV4 captured by the actual cameras C1 to C4 according to the first display method of FIG. 9B. When an operator performs an operation of designating a subject ESC1 of interest (for example, getaway vehicle) while the subject ESC1 is displayed on the output unit 94 as illustrated in FIG. 10A, the retrieval terminal 90 transmits a video analysis request to the recording server 50 or the cloud server 70 in order to specify the subject ESC1 designated through the operation. The recording server 50 or the cloud server 70 detects the subject ESC1 appearing in the captured videos MOV2 to MOV4, and transmits the detection position (coordinate information) as a video analysis result to the retrieval terminal 90, based on the video analysis request transmitted from the retrieval terminal 90. The retrieval terminal 90 may apply a predetermined color frame onto the subject ESC1 in the captured videos MOV2 to MOV4 displayed on the output unit 94, based on the video analysis result transmitted from the recording server 50 or the cloud server 70. Accordingly, when the captured videos of the plurality of cameras are displayed in accordance with the viewpoint YJ1 to which the operator pays the most attention, the operator can perform a simple operation of designating the subject ESC1 of interest (for example, getaway vehicle), thereby checking the same subject with the color frame in the captured videos of the other cameras. Thus, the operator can easily track the subject.

Next, the second display method will be described. The duplicated contents with the descriptions of the first display method are omitted herein.

According to an operation of an operator to designate the viewpoint YJ1, the retrieval terminal 90 displays the captured videos GM1 to GM4 of the cameras C1 to C4 on one screen. Specifically, the captured video GM1 of the camera C1 (refer to a screen A) is disposed at the largest size. The captured video GM3 of the camera C3 (refer to a screen C) is distorted in the side-to-side direction (horizontal direction), and disposed at a smaller size than the captured video GM1. The captured video GM2 of the camera C2 (refer to a screen B) is inverted in the side-to-side direction (horizontal direction), and distorted and disposed at the left side of the captured video GM1 of the camera C1. The captured video GM4 of the camera C4 (refer to a screen D) is inverted in the side-to-side direction (horizontal direction), and distorted and disposed at the right side of the captured video GM1 of the camera C1. In this way, the retrieval terminal 90 displays the captured videos GM1 to GM4 on the output unit 94 (refer to the right side of FIG. 9A).

In the second display method, the screen arrangement of the captured videos is set based on the positional relation among the captured videos which are displayed when the captured video GM1 (refer to the screen A) is disposed in front of a three-sided mirror in accordance with the viewpoint YJ1.

When seen from the viewpoint YJ1, the camera C2 is installed at the left side of the camera C1 (on the upper side in FIG. 9A). However, when it is assumed that the captured video GM1 is disposed in front of the three-sided mirror, the captured video GM2 of the camera C2 is disposed at the right top of the captured video GM1 when displayed on the output unit 94. When seen from the viewpoint YJ1, the camera C3 is installed at the right side of the camera C1 (the right side in FIG. 9A). However, when it is assumed that the captured video GM1 is disposed in front of the three-sided mirror, the captured video GM4 of the camera C4 is disposed at the left top of the captured video GM1 when displayed on the output unit 94.

The captured video GM2 of the camera C2 is inverted in the side-to-side direction (horizontal direction), and distorted and displayed in such a manner that a portion of the captured video at the left view angle in the optical axis direction during capturing of the camera C2 becomes a lower end portion, and a portion of the captured video at the right view angle in the optical axis direction during capturing of the camera C2 becomes an upper end portion.

The captured video GM4 of the camera C4 is inverted in the side-to-side direction (horizontal direction), and distorted and displayed in such a manner that a portion of the captured video at the left view angle in the optical axis direction during capturing of the camera C4 becomes a lower end portion, and a portion of the captured video at the right view angle in the optical axis direction during capturing of the camera C4 becomes an upper end portion.

In the second display method as shown in FIG. 9B, the captured video GM1 of the camera C1 corresponding to the screen A is displayed without a particular distortion process. The captured video GM2 of the camera C2 corresponding to the screen B is inverted in the side-to-side direction (horizontal direction), and distorted and displayed in the above-described manner. The captured video GM3 of the camera 3 corresponding to the screen C is not subjected to the above-described distortion process, but inverted in the side-to-side direction (horizontal direction), resized to a smaller size than the captured video GM1, and then displayed. The captured video GM4 of the camera C4 corresponding to the screen D is inverted in the side-to-side direction (horizontal direction), and distorted and displayed in the above-described manner.

FIG. 10B illustrates one screen WD1 displayed on the output unit 94 of the retrieval terminal 90, the screen WC1 showing videos MOV1, MOV2r, MOV3r and MOV4r captured by the actual cameras C1 to C4 according to the second display method of FIG. 9B. When the operator performs an operation of designating a subject ESC1 of interest (for example, getaway vehicle) while the subject ESC1 is displayed on the output unit 94 as illustrated in FIG. 10B, the retrieval terminal 90 transmits a video analysis request to the recording server 50 or the cloud server 70 in order to specify the subject ESC1 designated through the operation. The recording server 50 or the cloud server 70 detects the subject ESC1 appearing in the captured videos MOV2r to MOV4r, and transmits the detection position (coordinate information) as a video analysis result to the retrieval terminal 90, based on the video analysis request transmitted from the retrieval terminal 90. The retrieval terminal 90 may apply a predetermined color frame onto the subject ESC1 in the captured videos MOV2r to MOV4r displayed on the output unit 94, based on the video analysis result transmitted from the recording server 50 or the cloud server 70. Accordingly, when the captured videos of the plurality of cameras are disposed and displayed in front of the three-sided mirror in accordance with the viewpoint YJ1 to which the operator pays the most attention, the operator can perform a simple operation of designating the subject ESC1 of interest (for example, getaway vehicle), thereby checking the same subject with the color frame in the captured videos of the other cameras. Thus, the operator can easily track the subject.

In the above-described investigation assist system 100 according to the third embodiment, the retrieval terminal 90 (an example of the operator terminal) is connected so as to communicate with the recording server 50 or the cloud server 70 which acquires captured videos of the cameras installed at each of the plurality of intersections. The retrieval terminal 90 acquires captured videos of the plurality of cameras C1 to C4 through the communication unit 93 (an example of an acquisition unit) from the recording server 50 or the cloud server 70, the plurality of cameras C1 to C4 being installed around an intersection where an event occurred among the plurality of intersections. The retrieval terminal 90 sets display regions for the captured videos of the plurality of cameras within one screen through the processor 92 (an example of a setting unit), based on the arrangement condition of the plurality of cameras surrounding the intersection where the event occurred. The retrieval terminal 90 displays the captured videos of the plurality of cameras, arranged on the respective display regions in the set screen, on the output unit 94 through the processor 92 (an example of a display control unit).

Accordingly, when an incident or accident occurred in an intersection where many people or vehicles come and go, the retrieval terminal 90 can multilaterally display the captured videos of the plurality of cameras on the output unit 94, enable the operator to visually acquire information indicating in which direction the vehicle involved in the occurrence of the incident or accident ran away, and assist finding the suspect or criminal of the incident or accident in early stage.

The processor 92 (an example of the setting unit) of the retrieval terminal 90 sets display regions in which captured videos of a set of cameras (for example, the cameras C2 and C4) facing each other with the intersection interposed therebetween among the plurality of cameras are distorted in the reverse direction (refer to the first display method). Accordingly, the retrieval terminal 90 can multilaterally display the captured videos in accordance with the viewpoint YJ1 designated by the operator, compared to when the captured videos GM1 to GM4 of the plurality of cameras are displayed at equal sizes in parallel to each other. Therefore, the operator can efficiently recognize the captured videos of the plurality of cameras.

The processor 92 (an example of a display control unit) of the retrieval terminal 90 inverts captured videos of at least a set of cameras (for example, the cameras C2 and C4) in the horizontal direction, and displays the inverted videos on the output unit 94 (refer to the second display method). Accordingly, compared to when the captured videos GM1 to GM4 of the plurality of cameras are displayed at equal sizes in parallel to each other, the retrieval terminal 90 can multilaterally display various captured videos while the most prominent video in is disposed in front of the three-sided mirror accordance with the viewpoint YJ1 designated by the operator. Therefore, the operator can efficiently recognize the captured videos of the plurality of cameras. At this time, the user (for example, an operator of the police station) can set any one of the first and second display methods as the method of displaying a captured video on the output unit 94, through an input operation using the operation unit 91. The setting information is stored in the memory 95 of the retrieval terminal 90, for example.

Background to Fourth Embodiment

In JP-A-2007-174016, the camera image information captured by the plurality of cameras is displayed on the display device in the terminal device mounted on the vehicle. Therefore, a user (for example, driver) can check real-time images at the locations where the respective cameras are disposed. However, in JP-A-2007-174016, it is not considered to narrow down an escape route of a vehicle having caused an event such as an incident or accident, when the event occurred in a traveling route of the vehicle (for example, an intersection where many people and vehicles come and go). In particular, when a vehicle (getaway vehicle) having run away from the intersection where the event occurred is tracked, the possibility that a vehicle passing the intersection during the same time of day will be the getaway vehicle is considered to be low. Therefore, although the technique described in JP-A-2007-174016 is used when the event such as an incident or accident occurred, an operator of a police station, having received a report, needs to retrieve candidates of the getaway vehicle among all vehicles passing through the intersection where the event occurred, when narrowing down the getaway vehicle corresponding to a tracking target. Furthermore, the operator requires labor and time to narrow down the candidates of the getaway vehicle, and has difficulties in finding the suspect or criminal of the incident or accident in early stage.

Therefore, the following fourth embodiment provides an investigation assist device, an investigation assist method and an investigation assist system, which can efficiently reduce labor and time required for narrowing down candidates of a getaway vehicle having run away from an intersection, and assist finding the suspect or criminal of an incident or accident in early stage, when the incident or accident occurred at the intersection where many people and vehicle come and go.

Fourth Embodiment

Since the investigation assist system according to the fourth embodiment has almost the same configuration as the investigation assist system 100 according to the first embodiment, the same components are represented by like reference numerals, the detailed descriptions thereof are simplified or omitted, and the following descriptions will be focused on different components. In the fourth embodiment, the recording server 50 and the cloud server 70 have pattern extraction units 56 and 76, respectively.

Figure 11A:
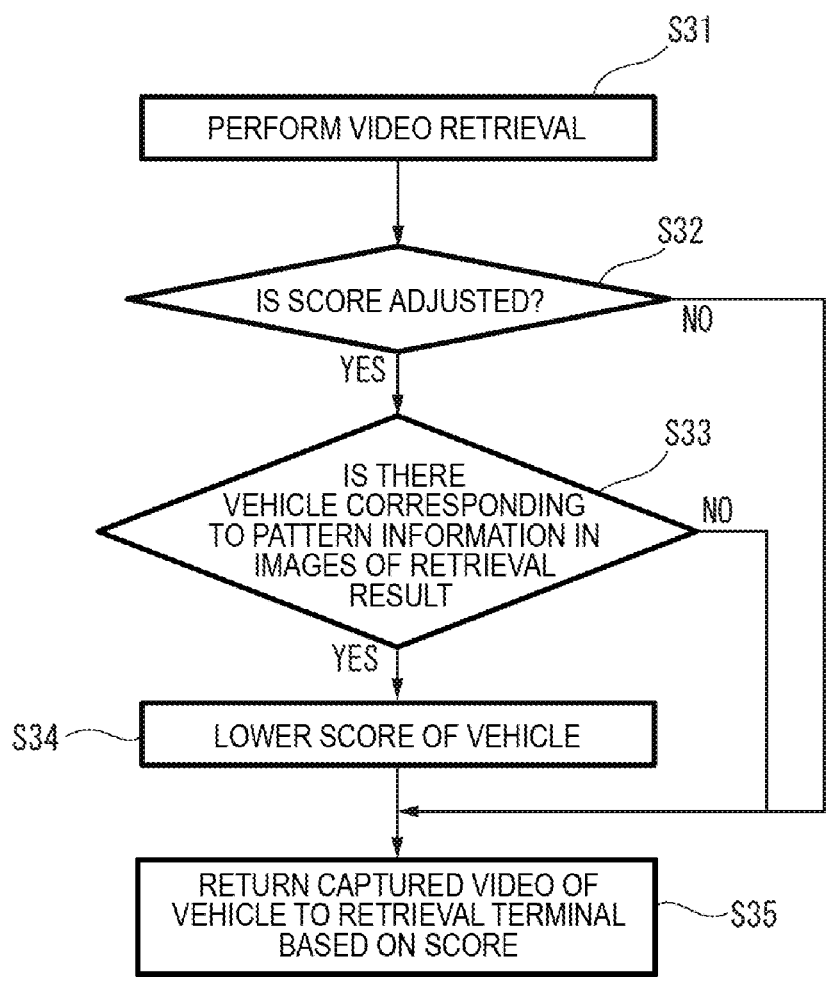
FIG. 11A is a flowchart illustrating a procedure example of an operation of narrowing down a getaway vehicle in a recording server or a cloud server according to a fourth embodiment.
Figure 11B:
FIG. 11B is a table showing an example of pattern information.
Figure 11C:
FIG. 11C is a table showing an example of retrieval results before and after score adjustment.

FIG. 11A is a flowchart illustrating a procedure of an operation of narrowing down a getaway vehicle in the recording server 50 or the cloud server 70 according to the fourth embodiment. FIG. 11B is a table showing an example of pattern information PTF1. FIG. 11C is a table showing retrieval results before and after score adjustment.

When tracking a vehicle (getaway vehicle) having run away from an intersection where an event such as an incident or accident occurred is considered, the possibility that a vehicle passing through the intersection during almost the same time of day will be the getaway vehicle is considered to be low. In the fourth embodiment, the recording server 50 or the cloud server 70 determines whether each vehicle has a behavior pattern, using captured video data and tag information which are recorded (stored) in the storage unit 52 or 72. The behavior pattern may indicate whether the same vehicle routinely passes through the same intersection at the same time of day. When determining that there is a vehicle satisfying the above-described behavior pattern, the recording server 50 or the cloud server 70 correlates the date and time information and the feature information of the vehicle satisfying the behavior pattern with the information of the intersection where the behavior pattern has been detected, and records (stores) the resultant information in the storage unit 52 or 72.

Since an event such as an incident or accident does not periodically occur but suddenly occurs, the possibility that a vehicle satisfying the above-described behavior pattern will be the vehicle having caused the event such as an incident or accident is considered to be low. Therefore, when the recording server 50 or the cloud server 70 acquires a retrieval request containing a retrieval key related to the getaway vehicle from the retrieval terminal 90 through an operation of the operator, for example, the recording server 50 or the cloud server 70 retrieves captured video data of a vehicle satisfying pattern information among one or more vehicles satisfying the retrieval key. The recording server 50 or the cloud server 70 decides the display priority of the captured video of the vehicle having caused the event on the retrieval terminal 90, using the retrieval result indicating that there is the vehicle satisfying the pattern information among the one or more vehicles satisfying the retrieval key. The recording server 50 or the cloud server 70 displays the captured video of the vehicle which is likely to be the getaway vehicle on the retrieval terminal 90, based on the decided display priority.

As illustrated in FIG. 11B, pattern information PTF1 may include the identification information (ID) of the pattern information PTF1, the feature data of a vehicle, and a pattern (date and time information on when the vehicle routinely passes through an intersection), which are correlated with one another for each intersection. For example, pattern information with identification information ID1 shows that the frequency at which a vehicle with feature data of 'ABC-123' passes through the intersection between 9:00 a.m. and 9:30 a.m. on weekdays from Monday to Friday is high. Furthermore, pattern information with identification information ID2 shows that the frequency at which a vehicle with feature data of 'JJJ-543' passes through the intersection between 10:00 a.m. and 11:00 a.m. on weekdays from Monday to Thursday is high. Moreover, pattern information with identification information ID3 shows that the frequency at which a vehicle with feature data of 'PAN-329' passes through the intersection between 12:00 p.m. and 1:00 p.m. on Saturday and Sunday is high. The feature data may be set to the number of the number plate of the corresponding vehicle or data indicating combination information of the type and color of the vehicle or a feature amount of captured image of the vehicle.

The procedure of the video retrieval operation in FIG. 11A corresponds to step Sc15 of the investigation scenario in FIG. 6. In FIG. 11A, when the recording server 50 or the cloud server 70 acquires a retrieval request containing a retrieval key related to a getaway vehicle and the date and time information of an event such as an incident or accident from the retrieval terminal 90 according to an operation of the operator, the recording server 50 or the cloud server 70 retrieves captured videos of vehicles through the video retrieval unit 53 or 73, the vehicles satisfying the pattern information PTF1 among one or more vehicles satisfying the retrieval key, at step S31. The video retrieval unit 53 or 73 determines whether to adjust a score indicating if each of the vehicles is the vehicle having caused the event as the video retrieval result, depending on the type of the reported event such as an incident or accident, at step S32. The video retrieval unit 53 or 73 transmits data of the captured video of the vehicles to the retrieval terminal 90 such that the captured video data are sequentially displayed on the retrieval terminal 90 in descending order of score (for example, the similarity of a vehicle appearing in the captured videos). The score is derived by the video retrieval unit 53 or 73 according to a publicly technique, for example. For example, when the reported event is an event such as a robbery case, which suddenly occurs, the video retrieval unit 53 or 73 determines that the score of the vehicle satisfying the pattern information PTF1 needs to be adjusted (Yes at step S32). In this case, the procedure of the recording server 50 or the cloud server 70 proceeds to step S33.

On the other hand, when the event is a traffic accident which may be caused by the vehicle satisfying the pattern information PTF1, the video retrieval unit 53 or 73 determines that the score of the vehicle satisfying the pattern information PTF1 does not need to be adjusted (No at step S32). In this case, the procedure of the recording server 50 or the cloud server 70 proceeds to step S35.

When the video retrieval unit 53 or 73 determines that there is a vehicle satisfying the pattern information PTF1 (or corresponding to the pattern information PTF1) among the captured videos obtained through the retrieval of step S31 (Yes at step S33), the video retrieval unit 53 or 73 lowers the score of the vehicle satisfying the pattern information PTF1 by a predetermined value (for example, 10 points) at step S34. For example, when a retrieval result SCR1 of the captured video at step S31 is obtained from the video of the intersection at 10:30 on Tuesday as illustrated in FIG. 11C, the video retrieval unit 53 or 73 derived the score of the feature data 'JJJ-543' of the vehicle as '85'. However, since it was determined that the vehicle satisfies the pattern information PTF1 after the derivation, the video retrieval unit 53 or 73 derives the score as '75' by lowering the score by the predetermined value (for example, 10 points). That is, the video retrieval unit 53 or 73 acquires the retrieval result SCR2 of the captured video as the processing result of step S34. In the retrieval result SCR2, the score of the feature data 'LMG-006' of another vehicle is not adjusted because the time of day at which the vehicle frequently appears is different from the feature data of the pattern information PTF1, and the score of the feature data 'PAN-329' of another vehicle is not adjusted because the feature information of the vehicle is not included in the pattern information PTF1.

Based on the captured video retrieval result SCR2 at step S34 or the captured video retrieval result SCR1 at step S31, the video retrieval unit 53 or 73 transmits the captured video data of the vehicles such that the captured video data are displayed on the output unit 94 of the retrieval terminal 90 according to the display priority which is decided based on the scores (step S35).

In the investigation system 100 according to the fourth embodiment, the recording server 50 and the cloud server 70 are connected to the cameras installed at the plurality of intersections so as to communicate with the cameras. The recording server 50 and the cloud server 70 record the pattern information, for each intersection, having the date and time information and the identification information of the vehicles having passed through each of the intersections and the captured videos of the cameras in correlation with the camera information and the intersection information, in the storage units 52 and 72. According to an information input containing the date and time information and the intersection information of the event and the feature information of the vehicle having caused the event (for example, an input of the operator to the retrieval terminal 90), the recording server 50 or the cloud server 70 retrieves a vehicle satisfying the pattern information in the captured videos of the cameras in the intersection where the event occurred, through the video retrieval units 53 and 73. The recording server 50 or the cloud server 70 derives a score indicating whether the vehicle is the vehicle having caused the event, using the retrieval result indicating the presence of the vehicle satisfying the pattern information. Based on the derived score, the recording server 50 or the cloud server 70 decides the display priority of the captured video of the vehicle having caused the event through the video retrieval unit 53 or 73. The recording server 50 or the cloud server 70 displays the captured videos of one or more corresponding vehicles on the retrieval terminal 90, based on the decided priority.

Accordingly, when an incident or accident occurred in an intersection where many people or vehicles come and go, the recording server 50 and the cloud server 70 can efficiently reduce labor and time required for narrowing down the getaway vehicle having run away from the intersection, and efficiently assist finding the suspect or criminal of the accident or incident in early stage.

When it is determined that there is a vehicle satisfying the pattern information PTF1, the recording server 50 or the cloud server 70 lowers the score of the vehicle satisfying the pattern information PTF1 by the predetermined value, and decides the display priority of the captured video data on the retrieval terminal 90. Accordingly, the recording server 50 or the cloud server 70 can lower the possibility that a vehicle routinely passing through the same intersection in the same time of day caused an accident or incident which suddenly occurs, and precisely extract a captured video of a vehicle which does not satisfy the pattern information PTF1.

When it is determined that there are no vehicles satisfying the pattern information PTF1, the recording server 50 or the cloud server 70 does not adjust the score of the vehicle satisfying the pattern information PTF1, and decides the display priority of the captured video data on the retrieval terminal 90. Accordingly, considering that even the vehicle satisfying the pattern information PTF1 may cause an incident or accident such as a traffic accident, the recording server 50 or the cloud server 70 can extract the captured video of the vehicle having caused the event such as an incident or accident with high precision.

The recording server 50 or the cloud server 70 generates the pattern information PTF1 based on the generation frequency of date and time information at which a vehicle passes through each of the intersections, and records (stores) the generated pattern information PTF1 in the storage unit 52 or 72. Accordingly, the recording server 50 or the cloud server 70 can generate information for lowering the possibility that a vehicle having caused an incident or accident is a vehicle routinely passing through the same intersection in the same time of day. Therefore, the recording server 50 or the cloud server 70 can efficiently reduce labor and time required for retrieving a captured video of the vehicle having caused the incident or accident.

Background to Fifth Embodiment

In JP-A-2007-174016, the camera image information captured by the plurality of cameras is displayed on the display device in the terminal device mounted on the vehicle. Therefore, a user (for example, driver) can check real-time images at the locations where the respective cameras are disposed. However, in JP-A-2007-174016, it is not considered to acquire and display a traffic situation when an event such as an incident or accident occurred on a traveling route of a vehicle (for example, an intersection where many people and vehicles come and go). In particular, when the event such as an incident or accident occurred, a reporter of the event such as an incident or accident may not correctly remember if a traffic signal facing the vehicle having caused the event was a red light or blue light. For this reason, although the technique described in JP-A-2007-174016 is used when the event such as an incident or accident occurred, an operator within a police station, having received the report, cannot simply ask the traffic situation at the intersection where the event such as an incident or accident occurred, and has difficulties in correctly recording the situation when the incident or accident occurred.

Therefore, the following fifth embodiment provides an operator terminal and a video display method, which can visually display a traffic situation around a vehicle having caused an incident or accident and assist an operator to correctly record the situation during the incident or accident, when the incident or accident occurred in an intersection where many people or vehicles come and go.

Fifth Embodiment

Since the investigation assist system 100 according to the fifth embodiment has the same configuration as the investigation assist system 100 according to the first embodiment, the same components are represented by like reference numerals, the detailed descriptions thereof are simplified or omitted, and the following descriptions will be focused on different components.

Figure 12A:
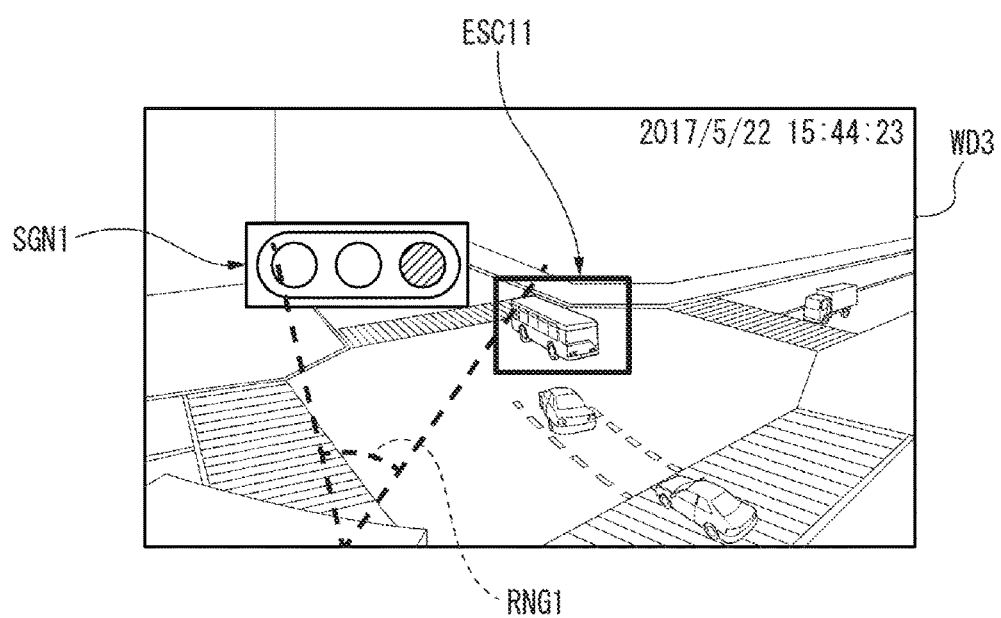
FIG. 12A is a diagram illustrating a first display example of a captured video displayed on a retrieval terminal according to a fifth embodiment.
Figure 12B:
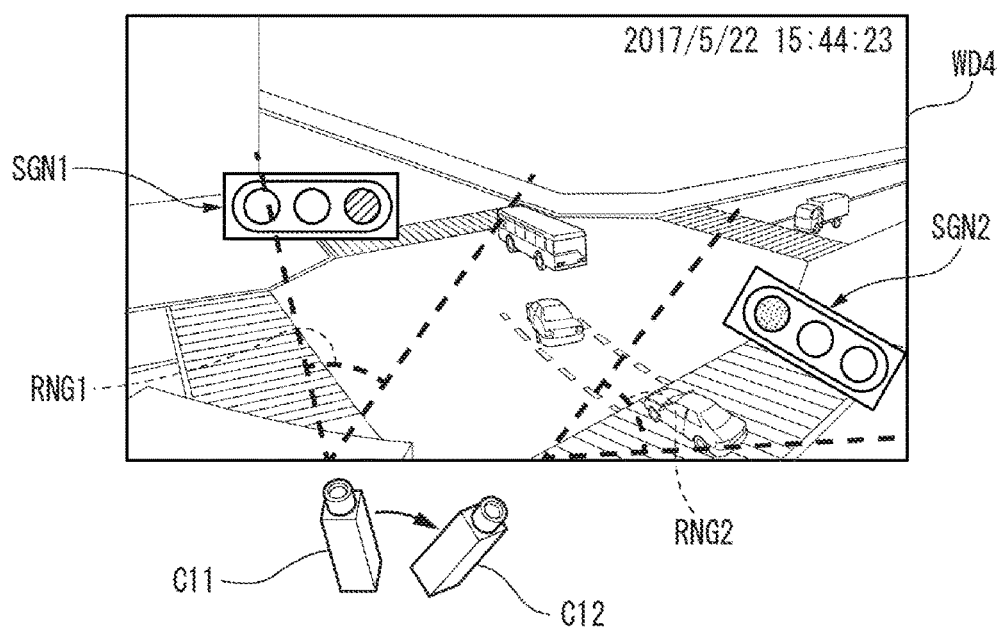
FIG. 12B is a diagram illustrating a second display example of a captured video displayed on the retrieval terminal according to the fifth embodiment.

FIG. 12A is a diagram illustrating a first display example of a captured video displayed on the retrieval terminal 90 according to the fifth embodiment. FIG. 12B is a diagram illustrating a second display example of a captured video displayed on the retrieval terminal 90 according to the fifth embodiment.

In FIGS. 12A and 12B, screens WD3 and WD4 for captured videos are displayed on the output unit 94 of the retrieval terminal 90 at step Sc16 of the scenario illustrated in FIG. 6. When receiving an operator's operation of inputting the date and time information and intersection information of an event such as incident or accident, the retrieval terminal 90 transmits a retrieval request (retrieval intersection) to the recording server 50 or the cloud server 70, the retrieval request containing the date and time information and the intersection information as a retrieval key. The retrieval terminal 90 displays captured video data on the output unit 94, the captured video data being transmitted from the recording server 50 or the cloud server 70.

When receiving an operation of inputting a visual field direction RNG1 for the intersection where the event such as an incident or accident occurred, with respect to the captured video displayed on the output unit 94, the retrieval terminal 90 transmits an analysis instruction to the recording server 50 or the cloud server 70 to analyze a situation indicated by a traffic situation indicator (for example, traffic signal) which is present in the visual field direction RNG1, using the information of the input visual field direction RNG1 as a retrieval key. Based on the analysis instruction transmitted from the retrieval terminal 90, the recording server 50 or the cloud server 70 analyzes the situation indicated by the traffic situation indicator (for example, traffic signal) installed in the input visual field direction RNG1, using captured video data of a camera at the corresponding date and time in the intersection set to a retrieval target.

The recording server 50 or the cloud server 70 transmits the analysis result of the situation indicated by the traffic situation indicator (for example, traffic signal) in the visual field direction RNG1 and the captured video data of the camera in the corresponding intersection to the retrieval terminal 90. The analysis result may include an image of a vehicle present in the visual field direction RNG1 at a point of time corresponding to the date and time information input to the retrieval terminal 90. The retrieval terminal 90 correlates a traffic signal image SGN1 and a vehicle image ESC11 with each other using the analysis result transmitted from the recording server 50 or the cloud server 70, and overlaps the traffic signal image SGN1 and the vehicle image ESC11 with the captured video to display on the output unit 94. The traffic signal image SGN1 shows a state of the traffic situation indicator (for example, traffic signal) in the visual field direction RNG1, and the vehicle image ESC11 shows a vehicle in the visual field direction RNG1. The traffic signal image SGN1 may be generated by the recording server 50 or the cloud server 70, and generated by the retrieval terminal 90 based on the analysis result. The traffic signal image SGN1 illustrated in FIG. 12A shows a red light. Therefore, when an incident or accident occurred, the traffic signal in the visual field direction RNG1 is a red light, and the vehicle image ESC11 shows that the vehicle was intended to run while ignoring the condition of the traffic signal. At the top of the captured video, the date and time information of the event such as an incident or accident, input to the retrieval terminal 90 may be displayed. In the following descriptions, the same applies.

When receiving the operator's operation to change the visual field direction RNG1, the retrieval terminal 90 transmits an analysis introduction to the recording server 50 or the cloud server 70 to analyze a situation indicated by the traffic situation indicator (for example, traffic signal) in a visual field direction RNG2, using information on the changed visual field direction RNG2 as a retrieval key. The center direction of the visual field direction RNG2 corresponds to a direction obtained by rotating the center direction of the visual field direction RNG1 by 90 degrees. Thus, as illustrated in FIG. 12B, the visual field direction to which the operator pays attention, that is, the direction that the operator wants to check a traffic situation in case of an event such as an incident or accident is changed from a camera C11 for capturing the visual field direction RNG1 to a camera C12 for capturing the visual field direction RNG2. The retrieval terminal 90 correlates a traffic signal image SGN2 showing the traffic situation indicator (for example, traffic signal) in the visual field direction RNG2 with a vehicle image (not illustrated) showing a vehicle in the visual field direction RNG2, using the analysis result transmitted from the recording server 50 or the cloud server 70, and overlaps the traffic signal image SGN2 and the vehicle image with the captured video to display on the output unit 94. The traffic signal image SGN2 shows a blue light. Therefore, when the incident or accident occurred, the traffic signal in the visual field direction RNG2 is a blue light, which shows that the vehicle (not illustrated) was intended to run while ignoring the condition of the traffic signal.

In the above-described investigation assist system 100 according to the fifth embodiment, the retrieval terminal 90 is connected so as to communicate with the recording server 50 or the cloud server 70 which acquires videos captured by the cameras installed at each of the plurality of intersections. The retrieval terminal 90 acquires captured videos of one or more cameras installed at the intersection where the event such as an incident or accident occurred among the plurality of intersections from the recording server 50 or the cloud server 70 through the communication unit 93 (an example of an acquisition unit), and displays the acquired videos on the output unit 94. The retrieval terminal 90 receives the date and time information of the event and an operation of inputting the visual field direction for the intersection where the event occurred, through the operation unit 91. The retrieval terminal 90 transmits an analysis request to the recording server 50 or the cloud server 70 through the communication unit 93 (an example of a request unit) to analyze the situation indicated by the traffic situation indicator (for example, traffic signal) in the visual field direction, using the captured video corresponding to the date and time information of the camera. The retrieval terminal 90 overlaps the analysis result for the situation indicated by the traffic situation indicator, transmitted from the recording server 50 or the cloud server 70, with the captured video corresponding to the date and time information of the camera, and displays the resultant video on the output unit 94.

Accordingly, when an incident or accident occurred in an intersection where many people or vehicles come and go, the retrieval terminal 90 can visually show a traffic situation around the vehicle having caused the incident or accident at a point of time that the incident or accident occurred, and assist the operator to correctly record the situation during the incident or accident.

The retrieval terminal 90 transmits an analysis instruction to the recording server 50 or the cloud server 70 through the communication unit 93 (an example of the request unit), such that the recording server 50 or the cloud server 70 analyzes the situation indicated by the traffic situation indicator in the visual field direction changed by the operation of changing the visual field direction. Accordingly, even when the visual field direction to which the operator pays attention was changed, the retrieval terminal 90 can enable the operator to easily check the situation indicated by the traffic situation indicator for the changed visual field direction, through a simple operation of designating the visual field direction of interest.

The traffic situation indicator is a traffic signal, for example. Therefore, the operator can easily check whether there was a vehicle having ignored the traffic signal at the intersection during the incident or accident, and track the vehicle.

The traffic situation indicator is a sign, for example. Therefore, the operator can easily check whether there was a vehicle having ignored the sign at the intersection during the incident or accident, and track the vehicle.

Background to Sixth Embodiment

In JP-A-2007-174016, the camera image information captured by the plurality of cameras is displayed on the display device of the terminal device mounted on the vehicle. Therefore, a user (for example, driver) can check real-time images at the locations where the respective cameras are disposed. However, in JP-A-2007-174016, it is not considered to narrow down an escape route of a vehicle having caused an event such as an incident or accident, when the event occurred in a traveling route of the vehicle (for example, an intersection where many people and vehicles come and go). For example, when an operator can narrow down an intersection where a getaway vehicle will appear after passing through the intersection where the event occurred in the case where a plurality of intersections are located adjacent to each other, it is possible to reduce labor and time required for retrieving the escape route of the getaway vehicle. For this reason, even though the technique described in JP-A-2007-174016 is used when the above-described event such as an incident or accident occurred, the operator cannot easily track the escape route of the getaway vehicle, and has difficulties in finding the suspect or criminal of the incident or accident in early stage.

Therefore, the following sixth embodiment provides an investigation assist system and an investigation assist method, which can efficiently reduce labor and time required for narrowing down a getaway vehicle having run away from an intersection, and assist finding the suspect or criminal of the incident or accident in early stage, when an incident or accident occurred in an intersection where many people and vehicle come and go.

Sixth Embodiment

Since the investigation assist system 100 according to the sixth embodiment has the same configuration as the investigation assist system 100 according to the first embodiment, the same components are represented by like reference numerals, the detailed descriptions thereof are simplified or omitted, and the following descriptions will be focused on different components.

Figure 13:
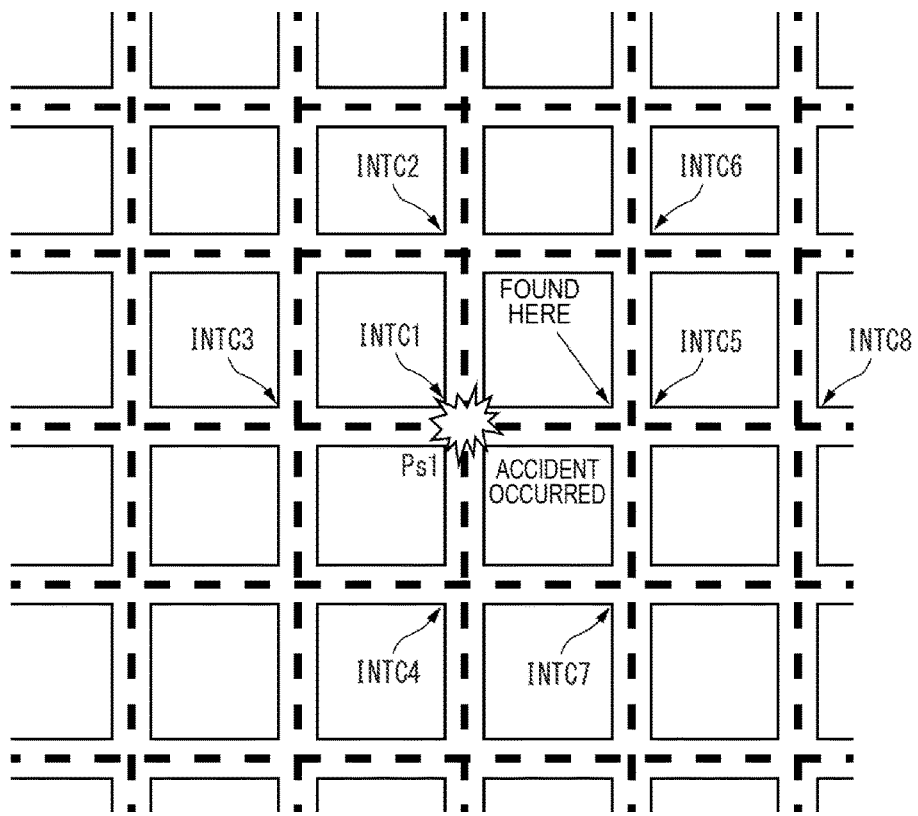
FIG. 13 is a diagram for describing an outline example of an operation of narrowing down a getaway vehicle through a recording server or a cloud server according to a sixth embodiment.
Figure 14:
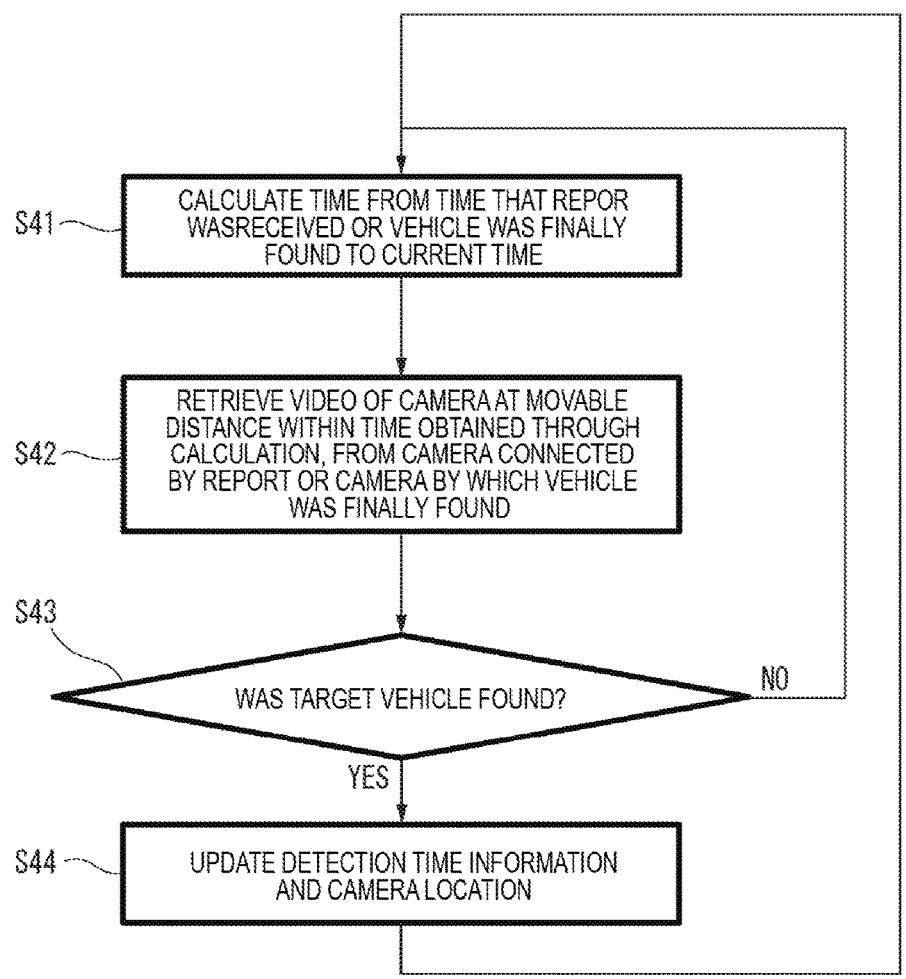
FIG. 14 is a flowchart illustrating a procedure example of the operation of narrowing down the getaway vehicle through the recording server or the cloud server according to the sixth embodiment.

FIG. 13 is a diagram for describing an operation of narrowing down a getaway vehicle through the recording server 50 or the cloud server 70 according to the sixth embodiment. FIG. 14 is a flowchart illustrating the procedure of the operation of narrowing down a getaway vehicle through the recording server 50 or the cloud server 70 according to the sixth embodiment. The procedure of the operation of narrowing down a getaway vehicle in FIG. 14 is performed by the recording server 50 or the cloud server 70 at step Sc15 of the investigation scenario in FIG. 6. In each of a plurality of intersections including intersections INTC1 to INCT8 illustrated in FIG. 13, one or more cameras (for example, one camera or four cameras) are installed.

Suppose that an incident occurred at a point Ps1 of the intersection INTC1 as illustrated in FIG. 13. When receiving an operator's operation of inputting the date and time information and intersection information of an event such as an incident or accident, the retrieval terminal 90 transmits a retrieval request (retrieval instruction) to the recording server 50 or the cloud server 70, the retrieval request containing the date and time information and the intersection information as a retrieval key. Based on the intersection information (information on the point Ps1 of the intersection INTC1) and the date and time information, the recording server 50 or the cloud server 70 extracts captured videos of the corresponding cameras, and transmit the extracted videos to display on the output unit 94 of the retrieval terminal 90. The retrieval terminal 90 sequentially displays the captured video data transmitted from the recording server 50 or the cloud server 70 on the output unit 94.

In the sixth embodiment, the recording server 50 or the cloud server 70 extracts and acquires captured video data of cameras since the date and time of the accident from the storage unit 52 or 72, the cameras installed in each of the intersections INTC2 to INTC5 adjacent to the intersection INTC1, and transmits the captured video data to display on the output unit 94 of the retrieval terminal 90. The retrieval terminal 90 sequentially displays the captured video data transmitted from the recording server 50 or the cloud server 70 on the output unit 94. Furthermore, the recording server 50 or the cloud server 70 analyzes the captured video data since the date and time of the accident, extracted from the respective cameras, and thus determines a presence of the vehicle having caused the accident at the point Ps1 or tracks the vehicle.

Whenever the getaway vehicle is detected at any one intersection (for example, intersection INTC5) among the intersections INTC2 to INCT5 through the above-described video analysis, the recording server 50 or the cloud server 70 extracts feature information on the getaway vehicle, and updates the feature information of the getaway vehicle. Similarly, the recording server 50 or the cloud server 70 extracts and acquires captured video data of cameras since the date and time of the accident from the storage units 52 and 72, the cameras being installed in each of the intersections INTC6 to INTC8 and INTC1 adjacent to the intersection INTC5, and repeatedly transmits the captured video data to display on the output unit 94 of the retrieval terminal 90. The retrieval terminal 90 sequentially displays the captured video data transmitted from the recording server 50 or the cloud server 70 on the output unit 94. The recording server 50 or the cloud server 70 analyzes the captured video data since the date and time of the accident, extracted from the respective cameras, and thus determines the presence of the getaway vehicle detected at the intersection INTC5 or tracks the vehicle. The recording server 50 or the cloud server 70 repeats the process.

Based on the position information of the intersection where the runaway was detected, the recording server 50 or the cloud server 70 may overlap the information on the detected route (escape route) of the getaway vehicle with road map information recorded (stored) in the storage unit 52 or 72, and transmit the road map information to display on the output unit 94 of the retrieval terminal 90. Furthermore, the recording server 50 or the cloud server 70 may derive a score indicating the possibility that each of the vehicles will be the getaway vehicle (refer to the fourth embodiment), and transmit the captured video data of the corresponding vehicles to the retrieval terminal 90 such that the captured video data are displayed on the output unit 94 in descending order of score.

When the captured videos of the cameras installed at each of the plurality of intersections are displayed on the retrieval terminal 90, the recording server 50 or the cloud server 70 may generate the captured video data as follows. Under the supposition that a vehicle considered as a getaway vehicle is being captured by a plurality of cameras or a plurality of frames, the recording server 50 or the cloud server 70 extracts data of a video in which a vehicle designated by the operator is captured, using the feature information (for example, type or shape of the vehicle) of the designated vehicle in the captured video displayed on the output unit 94. The recording server 50 or the cloud server 70 may generate display data by generating still images of the getaway vehicle and sorting the still images in order of time axes at which the images were captured, and display the generated display data on the retrieval terminal 90. Furthermore, the recording server 50 or the cloud server 70 may generate display data by generating still images of the getaway vehicle and sorting the still images in order of degree of definition, and display the generated display data on the retrieval terminal 90. Moreover, the recording server 50 or the cloud server 70 may generate display data by generating still images of the getaway vehicle and classifying and sorting the still images depending on the direction of the vehicle (for example, front, read or side) in the respective still images, and display the generated display data on the retrieval terminal 90. In this case, the recording server 50 or the cloud server 70 may transmit the still images and display data to the retrieval terminal 90, the display data capable of displaying information indicating the direction of the camera.

In FIG. 14, the recording server 50 or the cloud server 70 calculates a period of time from the time at which the report was received or the getaway vehicle was finally found (detected) to the current time, through the video retrieval unit 53 or 73, at step S41. The recording server 50 or the cloud server 70 retrieves a captured video of a camera through the video retrieval unit 53 or 73, the camera being located at a distance that the vehicle can normally move within the time calculated at step S41, from the camera connected by the report or the camera by which the getaway vehicle was finally found (detected), at step S42.

When the video retrieval unit 53 or 73 specifies the camera corresponding to a retrieval target at step S42, the video retrieval unit 53 or 73 does not use a physical straight distance from the occurrence point of the accident (accident occurrence point notified by the report) or the point where the getaway vehicle was finally detected, but uses a connection relation between intersections located within a distance from the point and included in the road map information recorded (stored) in the storage unit 52 or 72. The connection relation between the intersections may include the distance between the intersections or the average speed of the vehicle moving between the intersections. For example, when the connection distance of a road from the intersection INTC1 to the intersection INTC5 is 1 km, the average speed of the vehicle from the intersection INTC1 to the intersection INTC5 is 20 km/h, and the time calculated at step S41 is five minutes, the intersection INTC5 is included in the camera of the retrieval target at step S42. Furthermore, when the connection distance of a road from the intersection INTC1 to the intersection INTC6 is 2 km, the average speed of the vehicle from the intersection INTC1 to the intersection INTC6 is 10 km/h, and the time calculated at step S41 is five minutes, the intersection INTC6 is excluded from the camera of the retrieval target at step S42.

When the getaway vehicle was found (detected) as the retrieval result of step S42 (Yes at step S43), the recording server 50 or the cloud server 70 updates the detection time information of the vehicle detected at step S43 and the information of the location where the vehicle was detected, and records (stores) the updated information in the storage unit 52 or 72, at step S44. After step S44, the process of the recording server 50 or the cloud server 70 is returned to step S41 and then repeated.

When the recording server 50 or the cloud server 70 could not find (detect) the getaway vehicle (No at step S43), the recording server 50 or the cloud server 70 performs the process of step S41. That is, the recording server 50 or the cloud server 70 specifies a camera capable of detecting the getaway vehicle again. Whenever returning to step S41 after step S44, the recording server 50 or the cloud server 70 may wait for a predetermined waiting time (for example, 5 to 30 seconds). In other words, since the retrieval area is not widened even though the loop is precisely performed, the recording server 50 or the cloud server 70 performs retrieving again when a new intersection is included in the retrieval area or the number of passing vehicles increases after a predetermined time has elapsed. That is, whenever the process of step S44 is performed, the recording server 50 or the cloud server 70 may perform the process of step S41 after a predetermined time (for example, 5 to 30 seconds) has elapsed since the process of step S44. Accordingly, the recording server 50 or the cloud server 70 does not subdivide the retrieval area of the getaway vehicle more than needed, but can increase the number of camera candidates included in the retrieval area by setting the predetermined time to a grace period, thereby improving the retrieval precision for the getaway vehicle.

In the investigation assist system 100 according to the sixth embodiment, the recording server 50 or the cloud server 70 correlates the captured videos of the camera with the road map information including the plurality of intersections, the camera information, and the intersection information, and records the resultant information in the storage unit 52 or 72. As the date and time information and the intersection information of the event such as an incident or accident and the feature information of the vehicle having caused the event are input to the retrieval terminal 90, the recording server 50 or the cloud server 70 retrieves the vehicle through the video retrieval unit 53 or 73 (an example of the retrieval unit), using captured videos of the cameras at one or more intersections within a predetermined distance range from the intersection where the event occurred, the captured videos corresponding to the date and time information. The recording server 50 or the cloud server 70 updates the detection date and time information of the vehicle from the reception date and time information of the report indicating the occurrence of the event to the detection date and time information of the vehicle based on retrieval, updates the detection point information of the vehicle from the information on the intersection where the event occurred from information on another intersection where the vehicle was detected through retrieval, through the video retrieval unit 53 or 73, and stores the updated information in the storage unit 52 or 72.

Accordingly, when an incident or accident occurred at an intersection where many people or vehicles come and go, the recording server 50 or the cloud server 70 can efficiently reduce labor and time required for narrowing down a vehicle having run away from the intersection, and efficiently assist finding the suspect or criminal of the accident or incident in early stage.

The recording server 50 or the cloud server 70 analyzes the feature information of the vehicle detected by retrieval (for example, getaway vehicle) through the video retrieval unit 53 or 73, updates the feature information of the getaway vehicle by adding the analyzed feature information to the feature information of the vehicle, input by the operator, and stores the updated information in the storage unit 52 or 72. Therefore, since the feature information of the getaway vehicle can be additionally increased, the recording server 50 or the cloud server 70 can improve the reliability of the specifying of the getaway vehicle through the analysis of the captured video data, and display the captured video data of the getaway vehicle on the output unit 94 of the retrieval terminal 90, such that the operator can visually check the getaway vehicle.

The recording server 50 or the cloud server 70 extracts a camera of an intersection, used for retrieving, through the video retrieval unit 53 or 73, while a distance that the vehicle can move during a time difference between the current time information and the detection date and time information of the vehicle detected by retrieving is set to a predetermined distance. Therefore, the recording server 50 or the cloud server 70 not only considers a simple straight distance, but also considers a connection relation between roads or a time required for movement of the getaway vehicle. Thus, the recording server 50 or the cloud server 70 can easily specify a camera which can easily track the getaway vehicle.

The recording server 50 or the cloud server 70 repeatedly performs the vehicle retrieval through the video retrieval unit 53 or 73, using captured videos of the cameras at one or more intersections within a predetermined distance range from another intersection where the vehicle was detected by the retrieval, the captured video corresponding to the detection date and time information of the vehicle. Accordingly, the recording server 50 or the cloud server 70 can continuously track the getaway vehicle, and reduce labor and time required for retrieving the getaway vehicle.

Background to Seventh Embodiment

In JP-A-2007-174016, the camera image information captured by the plurality of cameras is displayed on the display device of the terminal device mounted on the vehicle. Therefore, a user (for example, driver) can check real-time images at the locations where the respective cameras are disposed. However, JP-A-2007-174016 does not consider narrowing down an escape route of a vehicle having caused an event such as an incident or accident, when the event occurred around a traveling route of the vehicle (for example, an intersection where many people and vehicles come and go). For this reason, even though the technique described in JP-A-2007-174016 is used when the above-described event such as an incident or accident occurred, the operator cannot track the escape route of the getaway vehicle, and has difficulties in finding the suspect or criminal of the incident or accident in early stage.

Therefore, the following seventh embodiment provides an investigation assist device, an investigation assist method and an investigation assist system, which can efficiently narrow down an escape route of a getaway vehicle, and assist finding the suspect or criminal of an incident or accident in early stage, when the incident or accident occurred around an intersection where many people and vehicle come and go.

Seventh Embodiment

Since the investigation assist system 100 according to the seventh embodiment has the same configuration as the investigation assist system 100 according to the first embodiment, the same components are represented by like reference numerals, the detailed descriptions thereof are simplified or omitted, and the following descriptions will be focused on different components.

Figure 15:
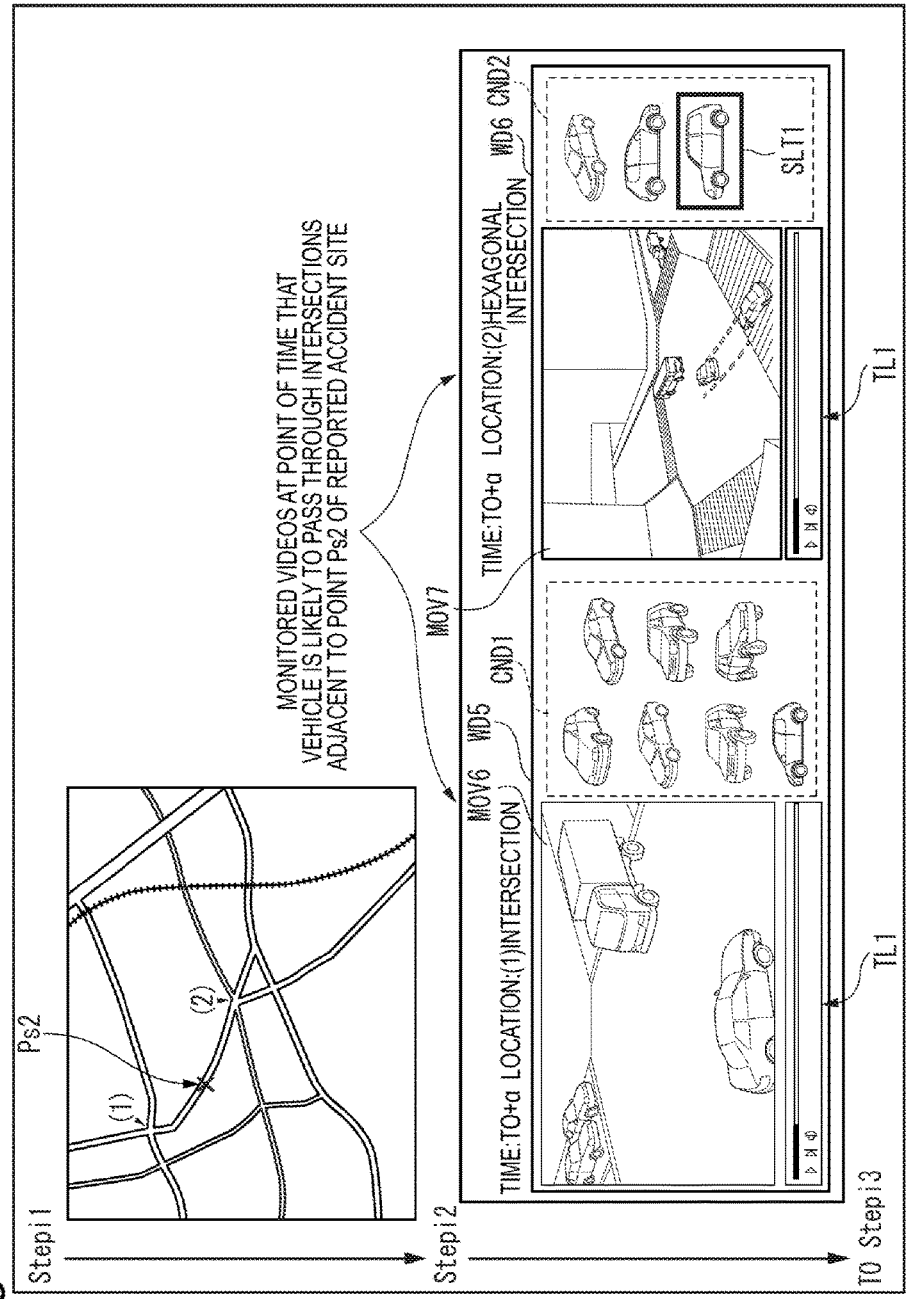
FIG. 15 is a diagram for describing an outline example of an operation of narrowing down a getaway vehicle in an investigation assist system according to a seventh embodiment.
Figure 16:
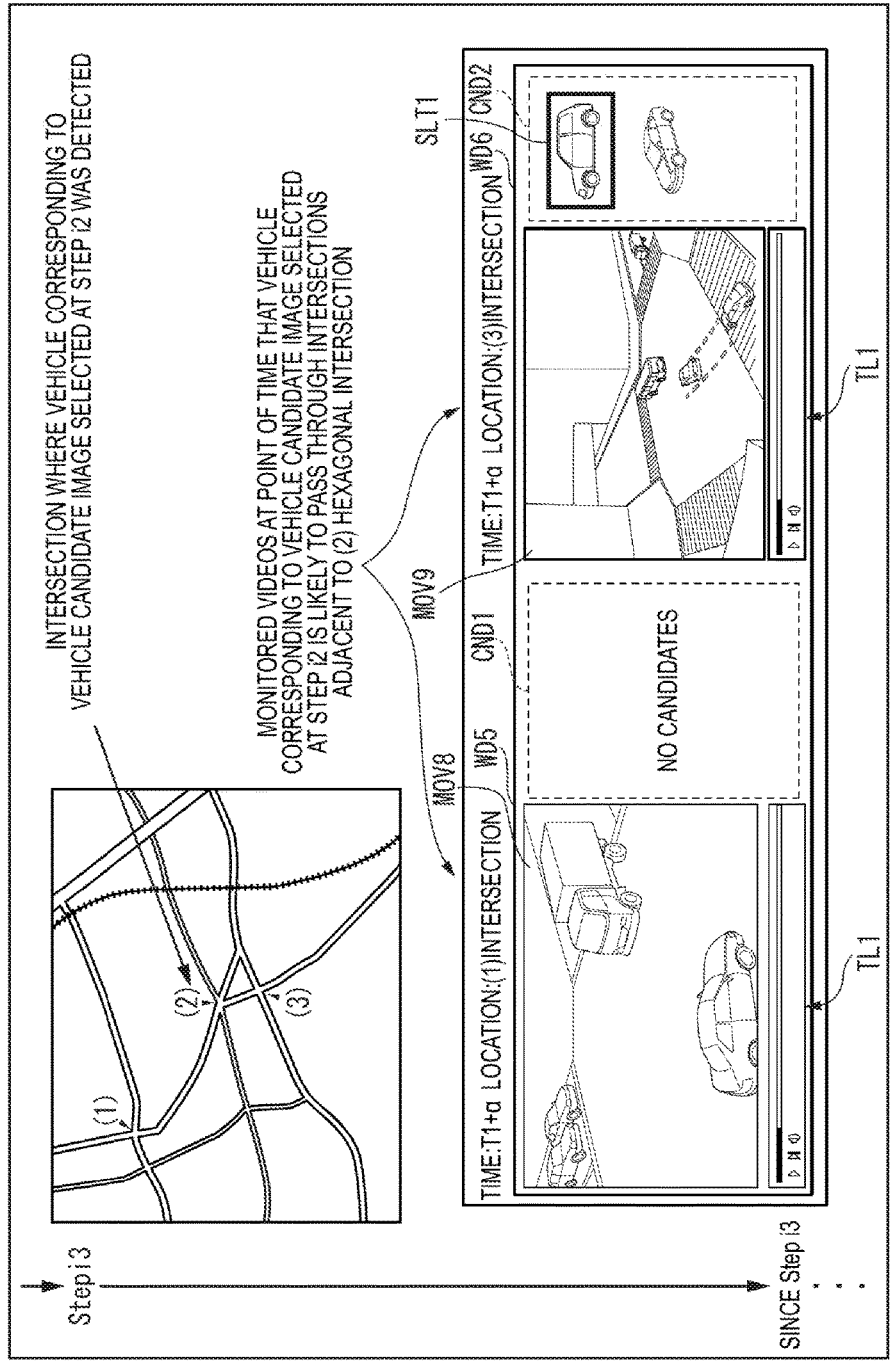
FIG. 16 is a diagram for describing the outline example of the operation of narrowing down the getaway vehicle in the investigation assist system according to the seventh embodiment.
Figure 17:
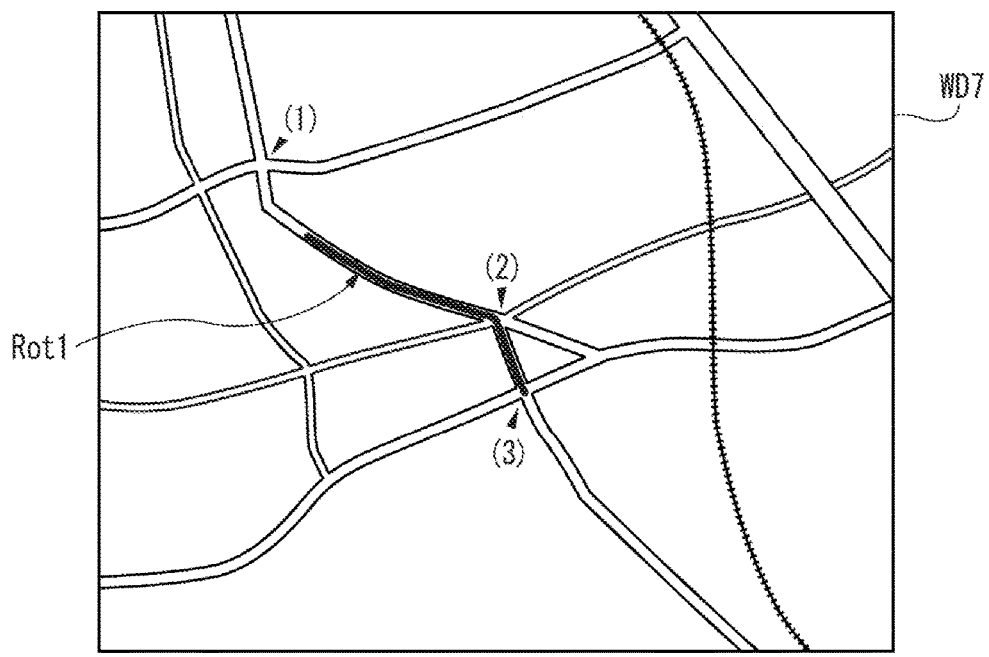
FIG. 17 illustrates an example of a screen for displaying an escape route of the getaway vehicle.
Figure 18:
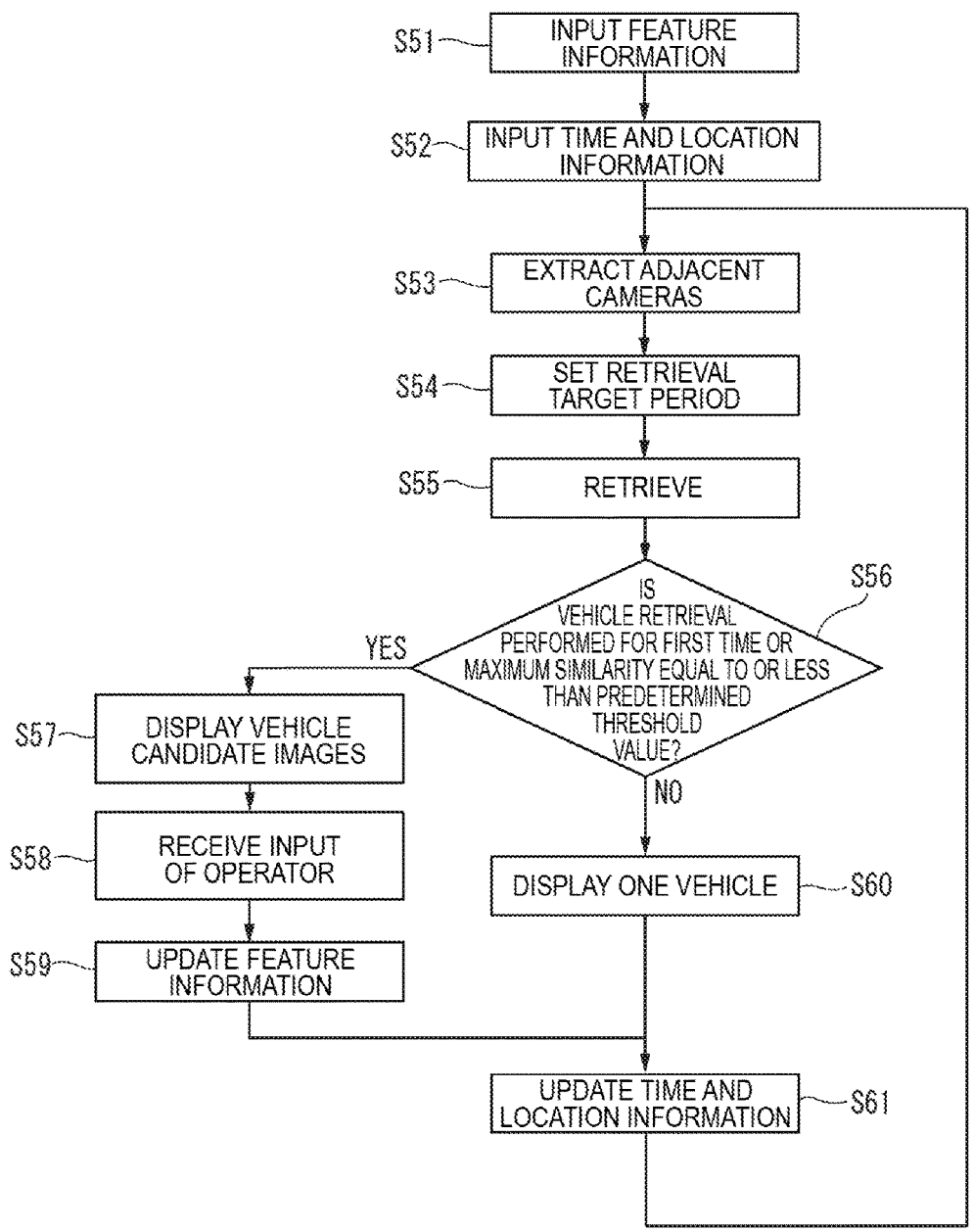
FIG. 18 is a flowchart illustrating a procedure example of the operation of narrowing down the getaway vehicle in the investigation assist system according to the seventh embodiment.

FIG. 15 is a diagram for describing an operation of narrowing down a getaway vehicle through the recording server 100 according to the seventh embodiment. FIG. 16 is a diagram for describing the operation of narrowing down a getaway vehicle through the recording server 100 according to the seventh embodiment. FIG. 17 illustrates a screen for displaying an escape route of a getaway vehicle. FIG. 18 is a diagram for describing the procedure of the operation of narrowing down a getaway vehicle through the recording server 100 according to the seventh embodiment. The procedure of the operation of narrowing down a getaway vehicle in FIGS. 15, 16 and 18 is performed by the recording server 50 or the cloud server 70 at step Sc15 of the investigation scenario illustrated in FIG. 6.

At step i1 of FIG. 15, suppose that there was a report saying that an accident occurred at a point Ps2 at time T0, the type of a vehicle having caused the accident is a car, the color of the vehicle is yellow, and the last digit of the number plate is 3. An operator in a police station inputs the various pieces of report information received through the report as data, generates a retrieval request (retrieval instruction) containing the data as a retrieval key, and transmits the retrieval request to the recording server 50 or the cloud server 70.

At step i2, the recording server 50 or the cloud server 70 retrieves data of captured videos MOV6 and MOV7 of cameras at a point of time that the getaway vehicle is likely to pass through one or more intersections adjacent to the point Ps2 corresponding to the reported accident site, based on the retrieval request (retrieval instruction) transmitted from the retrieval terminal 90. The recording server 50 or the cloud server 70 extracts image lists CND1 and CND2 of vehicles detected in captured videos for X minutes before and after the point of time that the getaway vehicle is likely to pass through the intersection (time T0+α), and transmits a retrieval result containing the extracted vehicle image lists and the captured video data such that the retrieval result is displayed on the output unit 94 of the retrieval terminal 90. The retrieval terminal 90 displays display screens WD5 and WD6 of the corresponding captured videos MOV6 and MOV7 transmitted from the recording server 50 or the cloud server 70, the vehicle image lists CND1 and CMD2, and reproduction control bars TL1 and TL2 of the captured videos MOV6 and MOV7 on the output unit 94. The reproduction control bars TL1 and TL2 are used to control the reproduction times of the captured videos MOV6 and MOV7. When a time required from the point of time that the getaway vehicle was detected (for example, the time T0) to the point of time that the getaway vehicle passes through the next intersection is α, the vehicle image lists show the vehicle detected in the captured videos during a predetermined time width (time 2X) including the time T0+α. Therefore, it is possible to say that the getaway vehicle is highly likely to be included in the vehicle image lists. The operator having input the report information selects the image of any one vehicle which is highly likely to be the getaway vehicle. According to the selection of the operator, the retrieval terminal 90 applies a color frame SLT1 onto the selected vehicle, and transmits the identification information of the selected vehicle to the recording server 50 or the cloud server 70. In the descriptions of FIGS. 15 and 16, the point of time that the vehicle having caused the accident at the point Ps2 was detected through the report is set to T0, and the point of time that the vehicle was detected at an intersection (3) adjacent to a hexagonal intersection (2) is set to T1.

FIG. 16 illustrates road map information at the top thereof, the road map information showing the intersection where the vehicle corresponding to the image of the vehicle candidate selected at step i2 was detected (specifically, hexagonal intersection (2)) and two intersections (specifically, intersections (1) and (3)) adjacent to the intersection. At step i3, the recording server 50 or the cloud server 70 receives the identification information of the vehicle from the retrieval terminal 90, and retrieves data of captured videos MOV8 and MOV9 of cameras at a point of time that the getaway vehicle is likely to pass through one or more intersections adjacent to the intersection where the vehicle was detected (specifically, hexagonal intersection (2)), based on the received identification information. Furthermore, the recording server 50 or the cloud server 70 extracts image lists CND1 and CND3 of vehicles detected in the captured videos for X minutes before and after the point of time that the getaway vehicle is likely to pass (time T1+α), and transmits a retrieval result containing the extracted vehicle image lists and the captured video data such that the retrieval result is displayed on the output unit 94 of the retrieval terminal 90. The retrieval terminal 90 displays display screens WD5 and WD6 of the corresponding captured videos MOV8 and MOV9 transmitted from the recording server 50 or the cloud server 70, the vehicle image lists CND1 and CND3, and reproduction control bars TL1 and TL2 of the captured videos MOV8 and MOV9 on the output unit 94. The reproduction control bars TL1 and TL2 are used to control the reproduction times of the captured videos MOV8 and MOV9. The vehicle with the frame SLT1, selected by the operator at step Si2, was not detected at the intersection (1) and not detected in the captured videos for the X minutes before and after, including the time T1+α. Therefore, the image of the vehicle is not displayed in the list CND1 at step i3. However, the list CND2 shows the vehicle with the frame SLT1, selected by the operator at step Si2, and one more vehicle. When the time required from the point of time that the getaway vehicle was detected (for example, time T1) to the point of time that the getaway vehicle passes through the next intersection is α, the vehicle image lists show the vehicles detected in the captured videos during a predetermined time width (time 2X) including the time T1+α. Therefore, it is possible to say that the getaway vehicle is highly likely to be included in the vehicle image lists. The operator having input the report information selects the image of any one vehicle which is highly likely to be the getaway vehicle. The retrieval terminal 90 applies the colored frame SLT1 onto the selected vehicle, according to the selection. Even after step Si3, the same process as steps i2 and i3 is repeated.

By repeating the process of steps i2 and i3 and the process after step i3, the recording server 50 or the cloud server 70 may generate data in which an escape route Rot1 of the getaway vehicle is overlapped with the road map information as illustrated in FIG. 17, and transmit the data to display on the output unit 94 of the retrieval terminal 90. The retrieval terminal 90 displays the road map information received from the recording server 50 and the cloud server 70 on the output unit 94. Accordingly, the operator can visually and intuitively recognize the escape route of the getaway vehicle from the report about the occurrence of the accident, and efficiently provide information to the investigation headquarter which supervises the suitable initial investigation of a policeman or the like. Furthermore, information indicating the escape direction (for example, an arrow or time information when the vehicle passes through each intersection) may be applied to the displayed escape route Rot1. For example, in the present embodiment, an arrow indicating a moving direction from the intersection (2) to the intersection (3) may be displayed on the escape route Rot1.

In FIG. 18, when the feature information of a vehicle having caused an accident is input through an operation input by the operator based on the report about the occurrence of the accident at step S51 and the date and time information and the site information of the accident are input at step S52, the retrieval terminal 90 transmits a retrieval request (retrieval instruction) containing the input information as a retrieval key to the recording server 50 or the cloud server 70. Based on the retrieval request (retrieval instruction) transmitted from the retrieval terminal 90, the recording server 50 or the cloud server 70 extracts (specifies) cameras of one or more intersections adjacent to the reported location or the location where the getaway vehicle was detected immediately before, through the video retrieval unit 53 or 73, at step S53. At step S53, the recording server 50 or the cloud server 70 specifies the cameras corresponding to the extraction target, using the road map information recorded (stored) in the storage unit 52 or 72 or information obtained by correlating the camera information and the intersection information with each other.

After step S53, the recording server 50 or the cloud server 70 sets a retrieval target period for retrieving captured videos of the cameras through the video retrieval unit 53 or 73, using the information on the point of time that the report was received (the date and time information of the event) or the point of time that the getaway vehicle was detected immediately before (in FIG. 18, set to time T0 for convenience), at step S54. The retrieval target period may include the period of the X minutes before and after, including the time T0+α described with reference to FIG. 15, or the period of the X minutes before and after, including the time T1+α described with reference to FIG. 16. Here, α may be set to a fixed value or a value obtained by dividing a distance by the average moving speed of the vehicle, the distance ranging from the point at which the getaway vehicle has been most recently detected to an intersection where the getaway vehicle is highly likely to be detected next time. That is, α represents the time from the point of time that the accident occurred or the getaway vehicle has been recently detected to the point of time that the same getaway vehicle is detected.

The recording server 50 or the cloud server 70 retrieves a vehicle having the feature information input at step S51 through the video retrieval unit 53 or 73, using captured video data of the cameras extracted at step S53 during the retrieval target period set at step S54 (step S55).

When the vehicle retrieval is performed for the first time or the maximum similarity (refer to the score in the fourth embodiment) as the retrieval result is equal to or less than a predetermined threshold value (Yes at step S56), the recording server 50 or the cloud server 70 extracts an image list of a plurality of vehicles detected in the captured videos during the retrieval target period set at step S54, as the retrieval result of step S55, and transmits a retrieval result containing the extracted vehicle image list and the captured video data, such that the retrieval result is displayed on the output unit 94 of the retrieval terminal 90, at step S57. According to a selection operation of the operator at step S58, the retrieval terminal 90 applies a color frame onto the selected vehicle, and transmits the identification information of the selected vehicle to the recording server 50 or the cloud server 70. The recording server 50 or the cloud server 70 analyzes the feature information of the vehicle selected by the selection operation of the operator through the video retrieval unit 53 or 73, updates the feature information of the vehicle (getaway vehicle), input at step S51, by adding the analysis result to the feature information, and records (stores) the updated information in the storage unit 52 or 72, at step S59. Furthermore, the recording server 50 or the cloud server 70 updates the information of the time and location that the vehicle selected at step S58 was detected, in order to set the information of the time and location to the latest information, at step S61. After step S61, the process of the recording server 50 or the cloud server 70 returns to step S53, and the process from step S53 to step S61 is repeated.

On the other hand, when the vehicle retrieval is not the first retrieval operation and the maximum similarity as the retrieval result (refer to the score in the fourth embodiment) is larger than the predetermined threshold value (No at step S56), it is considered that the vehicle selected at step S58 is the getaway vehicle and the precision of the process of retrieving the getaway vehicle (refer to step S55) is high. In this case, the recording server 50 or the cloud server 70 continuously transmits images of the getaway vehicle selected at step S58 as a formal process, such that the images are displayed on the output unit 94 of the retrieval terminal 90, at step S60. After step S60, the recording server 50 or the cloud server 70 updates the information of the time and location that the vehicle which is continuously selected even at step S60 was detected, in order to set the information of the time and location to the latest information, at step S61. After step S61, the process of the recording server 50 or the cloud server 70 returns to step S53, and the process from step S53 to step S61 is repeated.

In the investigation system 100 according to the seventh embodiment, the recording server 50 or the cloud server 70 is connected to the cameras installed at each of the plurality of intersections so as to communicate with the cameras. The recording server 50 or the cloud server 70 correlates the captured videos of the cameras with the camera information, the intersection information and the road map information including the plurality of intersections, and records the resultant data in the storage unit 52 or 72. According to an information input containing information on a first point (for example, the point Ps1) where an event occurred and the feature information of the vehicle having caused the event, the recording server 50 or the cloud server 70 extracts camera information of intersections adjacent to the first point through the video retrieval unit 53 or 73. The recording server 50 or the cloud server 70 retrieves a vehicle satisfying the feature information of the vehicle through the video retrieval unit 53 or 73, using captured videos of cameras specified by the extracted camera information. The recording server 50 or the cloud server 70 analyzes the feature information of the retrieved vehicle through the video retrieval unit 53 or 73. The recording server 50 or the cloud server 70 updates the feature information of the vehicle, input through the information input, through the video retrieval unit 53 or 73 by adding the analyzed feature information to the feature information, and stores the updated information in the storage unit 52 or 72. The recording server 50 or the cloud server 70 updates the detected point information of the vehicle from the information on the first point (for example, the point Ps1) into the detection point information of the retrieved vehicle through the video retrieval unit 53 or 73, and stores the updated information in the storage unit 52 or 72.

Accordingly, when an incident or accident occurred at an intersection where many people or vehicles come and go, the recording server 50 or the cloud server 70 can efficiently narrow down an escape route of a getaway vehicle, and efficiently assist finding the suspect or criminal of the accident or incident in early stage.

The recording server 50 or the cloud server 70 retrieves a plurality of vehicles satisfying the feature information of the vehicle, transmits images of the retrieved vehicles to display on the retrieval terminal 90, and analyzes the feature information of any one vehicle selected by the retrieval terminal 90 among the displayed vehicle image. The recording server 50 or the cloud server 70 updates the detection point information of the vehicle into the detection point information of any one vehicle selected by the retrieval terminal 90. Accordingly, as the operator receiving the report and having the report contents in his head directly selects a vehicle which is highly likely to be the getaway vehicle, the recording server 50 or the cloud server 70 can update the feature information of the getaway vehicle, narrow down captured videos of the getaway vehicle with high precision, and provide the captured videos to display on the retrieval terminal 90.

Whenever the detection point information of the vehicle is updated, the recording server 50 or the cloud server 70 extracts camera information of intersections adjacent to the detection point specified by the updated detection point information of the vehicle. Accordingly, since the getaway vehicle shows the characteristic that the getaway vehicle is highly likely to pass through any one intersection having cameras installed therein, the recording server 50 or the cloud server 70 can update the detection point information of the getaway vehicle whenever the getaway vehicle is detected at an intersection, and easily narrow down the escape route of the getaway vehicle.

The recording server 50 or the cloud server 70 sets a predetermined period as a retrieval target period for captured videos of the cameras through the video retrieval unit 53 or 73, the predetermined period containing the time of the report about the occurrence of the event or the detection time of the vehicle. Accordingly, since the predetermined period required until the getaway vehicle is detected in a captured video of a camera after the getaway vehicle was detected is validly set, the recording server 50 or the cloud server 70 can improve the detection precision for the getaway vehicle.

Although the various embodiments have been described with reference to the drawings, the present disclosure is not limited to the embodiments. It is obvious to those skilled in the art that various changes and modifications can be made within the category described in claims, and belong to the scope of the present disclosure. Moreover, the components in the various embodiments may be arbitrarily combined without departing the scope of the present disclosure.

The present disclosure is usefully applied as the investigation assist device, the investigation assist method and the investigation assist system, which can effectively narrow down escape routes of a getaway vehicle, and assist finding the suspect or criminal of an incident or accident in early stage, when the incident or accident occurred around an intersection where many people or vehicles come and go.

What is claimed is:

1. An investigation assist device connected to cameras installed at a plurality of intersections respectively so as to communicate with the cameras, the investigation assist device comprising:
   a processor; and
   a storage that records road map information including the plurality of intersections and captured video of each of the cameras in association with camera information and intersection information;
   wherein the processor retrieves a vehicle using the captured video of the cameras installed at one or more intersections within a predetermined distance range from an intersection where an event occurred, based on input information including date and time information when the event occurred, the intersection information where the event occurred, and feature information of a vehicle related to the event, the captured video corresponding to the date and time information when the event occurred,
   wherein the processor updates detection date and time information of the retrieved vehicle from reception date and time information on a report indicating an occurrence of the event to detection date and time information of the retrieved vehicle, updates detection point information of the retrieved vehicle from the intersection information on the intersection where the event occurred to intersection information on another intersection where the retrieved vehicle is detected, and stores the updated detection date, time information and detection point information in the storage.

2. The investigation assist device according to claim 1, wherein the processor analyzes the feature information of the retrieved vehicle,
   wherein the processor updates the feature information of the retrieved vehicle by adding the analyzed feature information to the feature information of the vehicle related to the event which is input by an operator, and stores the updated feature information in the storage.

3. The investigation assist device according to claim 1, wherein the processor selects a camera of an intersection used for retrieving among the cameras, based on the predetermined distance range derived from a distance that the vehicle related to the event can move during a time difference between current time information and the detection date and time information of the retrieved vehicle detected by the retrieving.

4. The investigation assist device according to claim 1, wherein the processor repeatedly performs a vehicle retrieval, using a captured video of each of the cameras installed at one or more intersections within a predetermined distance range from another intersection where the retrieved vehicle is detected, the captured video corresponding to the detection date and time information of the retrieved vehicle.

5. An investigation assist method using an investigation assist device connected to cameras installed at a plurality of intersections respectively so as to communicate with the cameras, the investigation assist method comprising:
    retrieving a vehicle using captured video of the cameras installed at one or more intersections within a predetermined distance range from an intersection where an event occurred, based on input information including date and time information when the event occurred, the intersection information where the event occurred, and feature information of a vehicle related to the event, the captured video corresponding to the date and time information;
    updating detection date and time information of the retrieved vehicle from reception date and time information on a report indicating an occurrence of the event to detection date and time information of the retrieved vehicle;
    updating detection point information of the retrieved vehicle from the intersection information on the intersection where the event occurred to intersection information on another intersection where the retrieved vehicle is detected; and
    storing the updated detection date, time information and detection point information in a storage.

6. An investigation assist system comprising:
    cameras installed at a plurality of intersections respectively; and
    an investigation assist device connected to the cameras so as to communicate with the cameras,
    wherein the investigation assist device includes:
    a processor; and
    a storage that records road map information including the plurality of intersections and captured video of each of the cameras in association with camera information and intersection information;
    wherein the processor retrieves a vehicle using the captured video of the cameras installed at one or more intersections within a predetermined distance range from an intersection where an event occurred, based on input information including date and time information when the event occurred, the intersection information where the event as occurred, and feature information of a vehicle related to the event, the captured videos corresponding to the date and time information when the event occurred,
    wherein the processor updates detection date and time information of the retrieved vehicle from reception date and time information on a report indicating an occurrence of the event to detection date and time information of the retrieved vehicle, updates detection point information of the retrieved vehicle from the intersection information on the intersection where the event occurred to intersection information on another intersection where the retrieved vehicle is detected, and stores the updated date, time information and detection point information in the storage.

* * * * *